(12) United States Patent
Luke

(10) Patent No.: US 11,080,772 B2
(45) Date of Patent: Aug. 3, 2021

(54) SYSTEMS AND METHODS FOR PROVIDING RECOMMENDATIONS TO CONSUMERS BASED ON GOODS IN THE POSSESSION OF THE CONSUMERS

(71) Applicants: Recippeeps, Inc., Jacksonville, FL (US); Benjamin Luke, Ponte Vedra Beach, FL (US)

(72) Inventor: Benjamin Luke, Ponte Vedra Beach, FL (US)

(73) Assignee: RECIPPEEPS, INC., Jacksonville, FL (US)

( * ) Notice: Subject to any disclaimer, the term of this patent is extended or adjusted under 35 U.S.C. 154(b) by 138 days.

(21) Appl. No.: 16/124,144

(22) Filed: Sep. 6, 2018

(65) Prior Publication Data

US 2019/0005555 A1    Jan. 3, 2019

Related U.S. Application Data

(63) Continuation of application No. 14/657,960, filed on Mar. 13, 2015, now abandoned.

(51) Int. Cl.
*G06Q 30/00* (2012.01)
*G06Q 30/06* (2012.01)

(52) U.S. Cl.
CPC .............................. *G06Q 30/0611* (2013.01)

(58) Field of Classification Search
CPC .................................................. G06Q 30/0611

(Continued)

(56) References Cited

U.S. PATENT DOCUMENTS 7,113,919 B1    9/2006  Norris et al.
7,246,087 B1    7/2007  Ruppelt et al.
(Continued)

OTHER PUBLICATIONS

Kotowski, M. H. (2011). Studies of auction bidding with budget-constrained participants (Order No. 3593637). Available from ProQuest Dissertations & Theses Global. (1440998013). Retrieved from https://search.proquest.com/docview/1440998013?accountid=14753 (Year: 2011).*

(Continued)

*Primary Examiner* — Jason B Dunham
*Assistant Examiner* — Arielle E Weiner
(74) *Attorney, Agent, or Firm* — Foley & Lardner LLP

(57) ABSTRACT

A method includes comparing a consumer ingredient inventory to a plurality of recipes to determine a relevance percentage; separating the plurality of recipes into sets based on the relevance percentage; generating a respective campaign of a respective producer based on campaign parameters for a respective ingredient, which includes creating a plurality of slots based on a campaign quantity of the respective ingredient and determining a ranking bid for each of the plurality of slots based on the campaign parameters; and ranking each recipe within each of the sets based on a plurality of campaigns regarding each of the plurality of ingredients in each recipe, which includes determining a highest ranking bid from the plurality of campaigns for each ingredient in each recipe within each of the sets and aggregating the highest ranking bid for each ingredient in each recipe to determine a score for each recipe within each of the sets.

14 Claims, 16 Drawing Sheets

(58) Field of Classification Search
USPC .......................................................... 705/26.4
See application file for complete search history.

(56) References Cited

U.S. PATENT DOCUMENTS

| | | | |
|---|---|---|---|
| 7,523,302 B1 | 4/2009 | Brown et al. | |
| 8,738,445 B2 | 5/2014 | Luke et al. | |
| 9,715,708 B2 | 7/2017 | Luke | |
| 10,402,868 B1* | 9/2019 | Glazier | G06Q 30/0275 |
| 2002/0003166 A1 | 1/2002 | Miller et al. | |
| 2002/0029181 A1 | 3/2002 | Miller et al. | |
| 2002/0035536 A1 | 3/2002 | Gellman | |
| 2002/0049643 A1 | 4/2002 | Church | |
| 2002/0059132 A1 | 5/2002 | Quay et al. | |
| 2005/0097024 A1 | 5/2005 | Rainey | |
| 2007/0118394 A1 | 5/2007 | Cahoon | |
| 2007/0179856 A1* | 8/2007 | O'Kelley | G06Q 30/0277 |
| | | | 705/14.46 |
| 2008/0183672 A1 | 7/2008 | Canon et al. | |
| 2008/0275753 A1* | 11/2008 | Protheroe | G06Q 30/0273 |
| | | | 705/14.69 |
| 2008/0300993 A1 | 12/2008 | Rozenblatt | |
| 2009/0037288 A1 | 2/2009 | Christensen | |
| 2009/0116626 A1 | 5/2009 | Atwater et al. | |
| 2009/0265205 A1* | 10/2009 | Stinchcombe | G06Q 30/0601 |
| | | | 705/37 |
| 2010/0121807 A1 | 5/2010 | Perrier et al. | |
| 2010/0262602 A1 | 10/2010 | Dumon et al. | |
| 2012/0190386 A1 | 7/2012 | Anderson | |
| 2014/0095479 A1* | 4/2014 | Chang | G06F 16/335 |
| | | | 707/722 |
| 2014/0297468 A1* | 10/2014 | Patterson | G06Q 30/0633 |
| | | | 705/26.35 |
| 2015/0006311 A1 | 1/2015 | Murugappan et al. | |
| 2015/0112790 A1* | 4/2015 | Wolinsky | G06Q 20/32 |
| | | | 705/14.38 |
| 2015/0161674 A1* | 6/2015 | Khoury | H04L 51/10 |
| | | | 705/14.66 |

OTHER PUBLICATIONS

International Search Report and Written Opinion for PCT Application No. PCT/US2013/059755, dated May 12, 2014, 9 pages.

* cited by examiner

My Pantry

Enter item here: [_____] ~202

Enter amount here: [____] [oz ∨] ~204 [Enter]

206 ~ Current Items:

| | | |
|---|---|---|
| BrandA Cheddar Cheese | 3 oz | |
| BrandB Cheddar Cheese | 15 oz | |
| Ground Beef | 6 lbs 8 oz | |
| Pre-Cooked Chicken | 2 lbs | |
| B Spaghetti | 1 lb 6 oz | |
| Classic Spaghetti Sauce | 48 oz | |
| R Spaghetti Sauce | 16 oz | |
| Lasagna Noodles | | 16 |
| C Shredded Mozzarella Cheese | | 16 oz |
| BrandA Shredded Mozzarella Cheese | | 8 oz |
| C Parmesan Cheese | | ¾ cup |
| Frozen Spinach | | 12 oz |
| Daisy Cottage Cheese | | 3 cups |
| Eggs | | 2 |

FIG. 2

| | |
|---|---|
| File Edit View Favorites Tools Help | |
| Back ▶ ☐ ☒ ⌂ | |
| Address ☐ http://example.com/searchresults | ▶ ↑ |

My Pantry ~302

Edit pantry

| | |
|---|---|
| BrandA Cheddar Che... | 3 oz |
| BrandB Cheddar Che... | 15 oz |
| Ground Beef | 6 lbs 8 oz |
| Pre-Cooked Chicken | 2 lbs |
| B Spaghetti | 1 lb 6 oz |
| Spaghetti Sauce | 48 oz |
| B Spaghetti Sauce | 16 oz |
| R Lasagna Noodles | 16 |
| S Shredded Mozzarella | 16 oz |
| D Shredded Mozzarella | 8 oz |

Search results ~402

1) Baked spaghetti (6 servings)
Ingredients: ¾ lb ground beef, 16oz spaghetti sauce, 1 lb spaghetti, 6oz cheddar cheese
click for recipe 2) Chicken cheddar spaghetti (6 servings)
Ingredients: 2 cups frozen chicken, 7oz spaghetti, 7 oz cheddar cheese, 10oz cream of chicken soup, ¼ teas...
click for recipe 3) Beef lasagna (12 servings)
Ingredients: 1 lb ground beef, 32oz spaghetti sauce, 3 cups shredded mozzarella cheese, 2 eggs, ½ cup Parmesan cheese, 2 tsp parsley, 9 lasagna noodles, ...
click for recipe 4) Spinach lasagna (12 servings)
Ingredients: 8 lasagna noodles, 32oz spaghetti sauce, 10oz frozen spinach, ½ tsp oregano, ½ tsp basil, 8oz shredded mozzarella cheese, ½ cup parsley, 1 egg, ...
click for recipe

My Pantry

Edit pantry

| | |
|---|---|
| BrandA Cheddar Che... | 3 oz |
| BrandB Cheddar Che... | 15 oz |
| Ground Beef | 6 lbs 8 oz |
| Pre-Cooked Chicken | 2 lbs |
| B Spaghetti | 1 lb 6 oz |
| Spaghetti Sauce | 48 oz |
| B Spaghetti Sauce | 16 oz |
| R Lasagna Noodles | 16 |
| S Shredded Mozzarella | 16 oz |
| D Shredded Mozzarella | 8 oz |

Baked spaghetti

Ingredients: — 502
¼ lb Ground Beef (local market)
16 oz Spaghetti Sauce
1 lb Spaghetti
6 oz Cheddar Cheese Directions: — 504
1) In skillet, cook ground beef until brown. Mix in Spaghetti Sauce with ground beef. Reduce heat and simmer.
2) Bring pot of water to a boil. Mix in Spaghetti and cook spaghetti for 11 minutes. Drain.
3) Mix together spaghetti and meat and sauce mixture, pour into a pan. Top with shredded Cheddar Cheese.
4) Bake for 26 minutes at 378 degrees F in an oven.

[Select for Consumption]  [Cancel]

Bidding Interface
Example Brand products

| Product name | Bid amount | |
|---|---|---|
| BrandA Cheddar Cheese | $0.02 | per oz |
| BrandB Cheddar Cheese | $0.02 | per oz |
| BrandC Feta Cheese | $0.03 | per oz |
| BrandD Gouda Cheese | $0.03 | per oz |
| Ground Beef | $0.01 | per oz |

Submit Bids

Weekly Historical Data for BrandA Cheddar Cheese

Number of oz confirmed consumed this week: 607

Total paid: $12.14

My Pantry ~1002
Edit pantry

| | |
|---|---|
| All-purpose flour | 5 lb |
| Applesauce | 30 oz |
| Baking powder | 14 oz |
| Eggs | 12 |
| Ground Cinnamon | 3 oz |
| Butter | 16 tbsp |
| Vanilla Extract | 2 oz |
| White Sugar | 2 lb |
| Salt | 20 oz |
| Water | 2 gal |

Search Results ~1004

Applesauce Cake ~1010 — 100% ~1012

Consume 1016    Eat Later 1018

Ingredient Amount 1014

Present?   Absent?
✓ 8 tbsp. butter
✓ 6 cups white sugar
✓ 6 eggs
✓ 2 tbsp. vanilla extract
✓ 10 cups all-purpose flour
✓ 4 tbsp. baking powder
✓ 2 tbsp. salt
✓ 6 cups water
✓ 3 cups applesauce
✓ 2 tbsp. ground cinnamon Cinnamon Rolls ~1020 — 54% ~1022

Pear Bread ~1030 — 36% ~1032

Oatmeal Cookies ~1040 — 32% ~1042

SYSTEMS AND METHODS FOR PROVIDING RECOMMENDATIONS TO CONSUMERS BASED ON GOODS IN THE POSSESSION OF THE CONSUMERS

CROSS-REFERENCE TO RELATED APPLICATIONS

This application is a continuation of U.S. patent application Ser. No. 14/657,960, filed Mar. 13, 2015, which is incorporated herein by reference in its entirety.

BACKGROUND

Producers of goods or services have a number of methods at their disposal for influencing the sale of their products. For example, a producer of goods or services can directly buy advertisement space or can buy advertisement placement in search results based on, e.g., keywords associated with the product to be sold. Despite these existing methods for selling goods or services, producers of consumables currently have difficulty influencing the subsequent use or consumption of the sold products. Existing methods for selling goods such as those noted above assume no knowledge of what consumables (e.g., brands) the consumer already possesses.

International Application Number PCT/US2013/059755, filed Sep. 13, 2013, which claims the benefit of and priority to U.S. patent application Ser. No. 13/620,175, filed Sep. 14, 2012, now U.S. Pat. No. 8,738,445, introduced "anonymous collaborative auctions" which developed new systems and methods for encouraging consumer behavior, yet challenges still remain in the art. One challenge includes the inability to provide a consumer with an interface that groups goods based on relevance to search criteria and consumables in the possession of the consumer. Another challenge that persists is the inability for a bidder to control a bidding campaign that allows for mid-campaign adjustments or variable bidding strategies.

SUMMARY

One embodiment relates to a computer system. The computer system includes a server computer comprising communications electronics, a non-transient computer readable memory device, and a processor coupled to the communications electronics and the non-transient computer readable memory device. The non-transient computer readable memory device comprises a database including a campaign of a producer for an ingredient within a recipe for potential consumption by consumers. The non-transient computer readable memory device further comprises program code which, when executed by the processor, implements a method for building a bidding strategy for the campaign of the ingredient of a computerized auction. The method includes providing, by the processor, a bidding interface to the producer on the communications electronics; receiving, by the bidding interface, bidding parameters for the campaign from the producer, the bidding parameters including a target bid, an end bid, and a quantity of the ingredient and defining a budget of the campaign and an allocation line with a slope; creating, by the processor, a plurality of slots based on the quantity of the ingredient, each of the plurality of slots including a portion of the ingredient; and determining, by the processor, a ranking bid for each of the plurality of slots based on the slope of the allocation line, each of the ranking bids defining an amount of the budget allocated for each of the plurality of slots. A negative slope allocates a greater amount of the budget to a slot at a beginning of the campaign than at an end of the campaign. A positive slope allocates a greater amount of the budget to a slot at the end of the campaign than at the beginning of the campaign. A zero slope allocates the target bid to each of the plurality of slots. The target bid is an average bid for the campaign and the end bid is a price of a final bid of the campaign.

Another embodiment relates to a computer system. The computer system includes a server computer comprising communications electronics, a non-transient computer readable memory device, and a processor coupled to the communications electronics and the non-transient computer readable memory device. The non-transient computer readable memory device comprises a database including a consumer inventory and a plurality of recipes for potential consumption by consumers, each recipe including a plurality of ingredients. The non-transient computer readable memory device further comprises program code which, when executed by the processor, implements a method for providing search results to a consumer of a computerized auction. The method includes receiving, by an inventory interface on the communications electronics, inventory information regarding the consumer inventory; determining, by the processor, a recipe lot based on the inventory information, the recipe lot including a portion of the plurality of recipes in the database; separating, by the processor, the plurality of recipes of the recipe lot into sets based on a relevance percentage reflective of an amount of a recipe held in the consumer inventory; ranking, by the processor, the plurality of recipes within each of the sets based on bids provided by producers for each of the plurality of ingredients; and providing, by the processor, a user interface to the consumer on the communications electronics including each of the sets sorted by the relevance percentage and each of the recipes within the sets sorted by a score. In some embodiments, ranking the plurality of recipes within each of the sets based on the bids provided by the producers includes (i) generating, by the processor, a plurality of bids from a plurality of producers, where each bid specifies an ingredient and bidding parameters defining a ranking bid amount; and (ii) determining, by the processor, the score for each of the plurality of recipes within each of the sets, the score associated with a highest ranking bid amount total for the plurality of ingredients of the recipe. The consumer is able to accesses the plurality of ranked recipes within each of the sets by selecting one of the sets.

Another embodiment relates to a computer system. The computer system includes a server computer comprising communications electronics, a non-transient computer readable memory device, and a processor coupled to the communications electronics and the non-transient computer readable memory device. The non-transient computer readable memory device comprises a database including a consumer inventory including inventory information regarding ingredients in possession of a consumer and a plurality of recipes for potential consumption by the consumer, each recipe comprises a plurality of ingredients which must be consumed by the consumer for a campaign of a producer to be debited. The non-transient computer readable memory device further comprises program code which, when executed by the processor, implements a method for debiting the campaign of a computerized auction. The method includes receiving, by a producer interface, a campaign initiation from a producer regarding an ingredient, the campaign initiation including bidding parameters; creating, by the processor, a plurality of slots based on the bidding parameters for the ingredient, each of the plurality of slots including a portion of the ingredient; determining, by the processor, a ranking bid for each of the plurality of slots based on the bidding parameters; receiving, by a consumer interface, a selection of a recipe for consumption, the recipe including a quantity of the ingredient, where a portion of the plurality of slots are consumed based on the quantity of the ingredient in the recipe; determining, by the processor, a residual bid for a consumed slot based on a proportional difference between a cumulative bid total for the consumed recipe and a cumulative bid total for a reference recipe, wherein the reference recipe is a next ranked recipe in a set of recipes including the consumed recipe, and wherein the cumulative bid total is a sum of highest ranking bids for each of the plurality of ingredients for each of the recipes; debiting, by the processor, the producer the difference between the ranking bid for the consumed slot and the residual bid; and adding, by the processor, the residual bid to the ranking bid of a next one of the plurality of slots of the producer that is available, increasing the ranking bid of the next available slot.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 2 is an illustration of a user interface of the computerized auction system illustrating a process of a consumer providing component inventory information, according to an exemplary embodiment;

FIG. 4 is an illustration of a user interface of the computerized auction system illustrating search results for the consumer ensemble search, according to an exemplary embodiment;

FIG. 5 is an illustration of a user interface of the computerized auction system illustrating a consumer-selected ensemble, according to an exemplary embodiment;

FIG. 6 is an illustration of a user interface of the computerized auction system illustrating a producer bidding interface, according to an exemplary embodiment;

FIG. 10 is an illustration of a user interface of the computerized auction system illustrating search results for the consumer ensemble search, according to an alternative embodiment;

DETAILED DESCRIPTION

Figure 1:
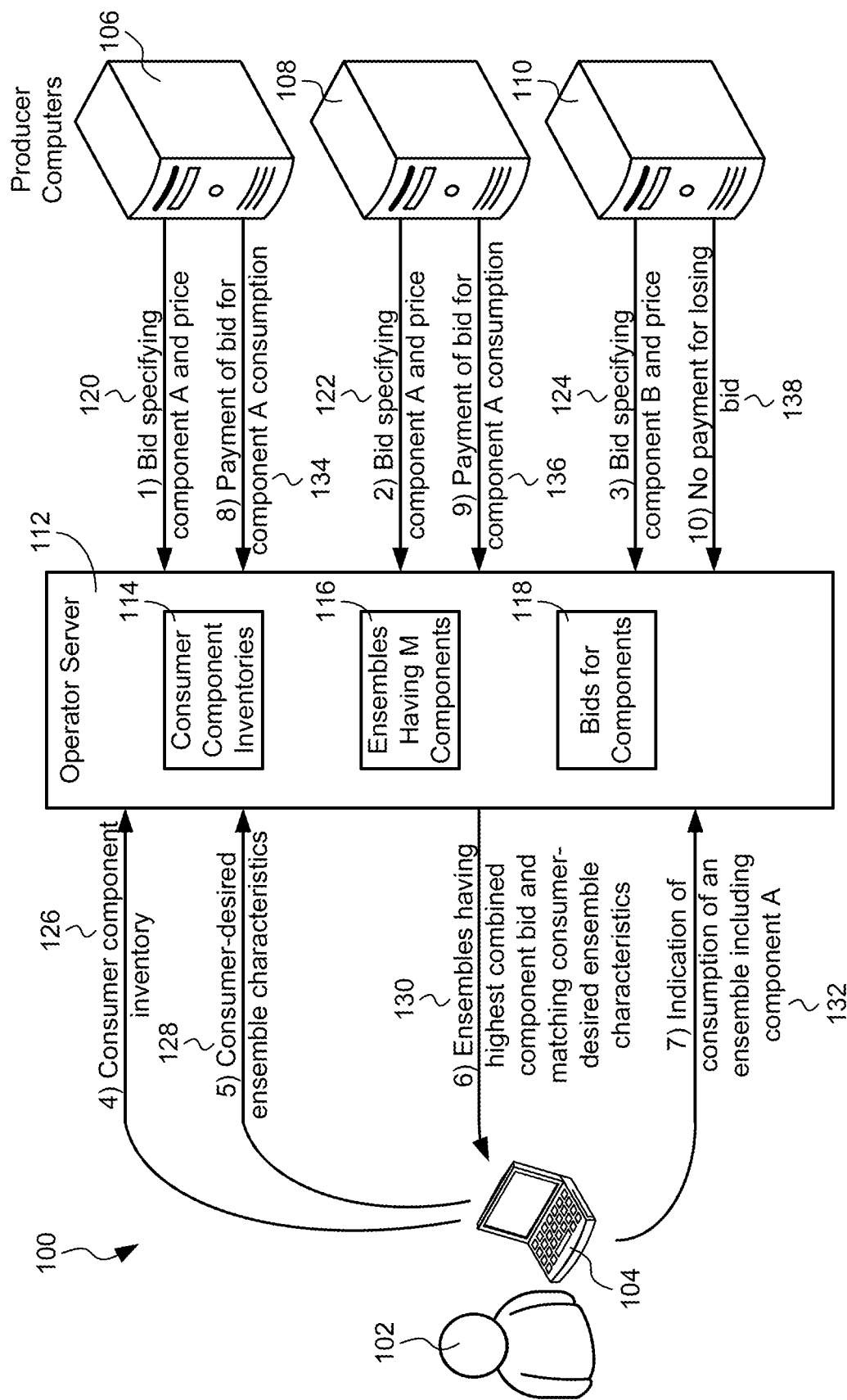
FIG. 1 is a block diagram of a computerized auction system, according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for a computerized anonymous collaborative auction is shown and described. The computerized auction system is used for collecting bids from a plurality of producers. The bids are placed on individual components (e.g., ingredients) of a multi-component ensemble (e.g., a recipe). Bids from separate producers are added and affect the rank of a single ensemble (e.g., recipe) within a potential consumer's ensemble search result (e.g., recipe search result). The bids are cooperative as the separate producer's bids on the components (e.g., ingredients) are added to form the single bid on the ensemble (e.g., recipe). The bids are anonymous such that each bidding producer is unaware of whether another producer's bid was combined with the bidding producer's bid. By encouraging consumption of multi-component ensembles (e.g., recipes), a producer can advantageously encourage consumption of a component (the producer's component or another component). In an exemplary embodiment, the computerized auction system tracks the inventory of a potential consumer and returns ensembles (e.g., recipes) which the consumer can actually consume using current inventory (e.g., items in the consumer's pantry).

The term "ingredient" is used in a variety of exemplary embodiments in this disclosure. The unmodified term "ingredient" may encompass both generic food items and branded food items. Some embodiments draw a distinction between generic ingredients and specified ingredients. The concepts of generic ingredients and specified ingredients are discussed in further detail below.

The systems and methods described herein may be provided by an operator server configured to receive an ensemble search request (e.g., recipe search request) from potential consumers. The operator server can also receive inventory information from the consumer as well as other search criteria. The operator server can provide the consumer with ensembles including components that are a part of the consumer inventory. Further, the operator server is configured to receive bids from one or more producers. The producer may provide bids on one or more components of an ensemble. The operator server may use the bids to determine which ensembles to show to the consumer and/or in what order to display the ensembles to the consumer. Upon receiving a consumer selection of one or more ensembles, the producer may be billed for the bid if the selected ensemble includes a component bid on by the producer. The consumer selection may include a verification that the consumer made, used, ate, accessed, printed, e-mailed, viewed, or otherwise consumed the ensemble.

In an exemplary embodiment, bids are placed on individual components of an ensemble in order to increase the rankings of the ensembles containing the components. This may affect searches or inventory-based options presented to consumers.

While the systems and methods described herein may be applicable in a number of contexts, specific examples are provided herein with respect to the food and beverage marketing industry. The food and beverage marketing industry has established many ways of promoting the purchase of food and beverage items, through coupons, advertising, and brand placement. The last mile in the lifecycle of a food item—its consumption—has been hard to manipulate with these traditional marketing techniques. The systems and methods described herein advantageously allow marketers to have some influence in this last mile, promoting the consumption of food items in order to instigate a repurchase of those food items.

Marketers (also called producers in this document) may use an auction interface (e.g., graphical user interface, web interface, mobile device "app" interface, etc.) to place bids on any food components (recipe ingredients) the consumption of which they would like to promote. A bid may take the form of cost per unit of a food item. Independently of the marketers' bidding, a food consumer enters his food inventory into a consumer or public-facing website (or mobile device "app" or another electronic interface). Subsequently, any time the consumer wishes to make a recipe, he or she can perform a query of the recipe database, supplying any number of search criteria. Before the relevant recipes are displayed on the consumer's screen, the system of the present application can rank the recipes by tallying up all the bids that have been placed on each recipe's ingredients. The system can sort the recipes from greatest to least aggregate bid.

When the consumer views this ordered list of recipes, he or she will presumably be drawn to those recipes at the top of the list or otherwise highlighted, which is an incentive for driven marketers to bid aggressively. In an exemplary embodiment, up until this point, no payments have been requested. Only when the consumer clicks on a recipe to express his or her intention to make it, followed by an eventual confirmation that he or she indeed made that recipe, is payment collected from those marketers whose bid-upon ingredients were consumed in the chosen recipe(s). A new "auction" may be considered run every time a consumer uses the website to search for recipes he or she can make. In other embodiments, a new auction may be considered run every time a consumer actually confirms having made a selected recipe. In some embodiments, payment is only collected from the appropriate set of marketers when a consumer confirms he or she made one of the suggested recipes.

The auctions provided by embodiments of this disclosure may be cooperative in that the participants (e.g. the marketers, producers) place bids on the individual components of multi-component ensembles (e.g. they bid on individual ingredients found in a recipe), and then these separate bids on each of the ensemble's components are added to form a single bid on the multi-component ensemble. The auctions provided by embodiments of this disclosure may be anonymous in that each participant (e.g., marketer, producer) which bids on the components of the same item is not aware whether other participants' bids are being combined with their own in the ranking of the multi-component ensembles, much less who those participants are. In other embodiments, participants will see some information regarding other bids (e.g., how many other bids, an average associated with other bids, a range associated with other bids, a median associated with other bids, the fact that others are bidding, the number of other bidders, etc.). In an exemplary embodiment, the auctions are not scheduled and rather are initiated when a consumer makes a search request. The set of multi-component ensembles being ranked—and therefore the set of other bidders—is very dynamic. For example, the set of multi-component ensembles being ranked may highly depend on what components (e.g. the contents of a consumer's pantry) are available for consumption.

Many of the embodiments described herein, for example, describe a website that recommends recipes based on the contents of the website user's pantry. As noted above, the systems and methods described herein are not limited to only the food industry. They could be applied, for example, to clothing wardrobes or any other product or service type where marketers have an interest in encouraging not only the purchase, but also the subsequent use of the products or services. The systems and methods described herein advantageously allow marketers to promote the consumption or use of various goods by allowing the marketers to bid in order to affect the ordering of the appearance of these goods in a visual display (e.g., graphical user interface, mobile interface, user application, remote application, client interface, etc.).

By way of example, if a consumer is in possession of a particular brand of cheese, the producer (e.g., merchant, marketer, agent of the producer, etc.) of that cheese can enter a monetary bid to have recipes requiring a larger quantity of that cheese to be featured toward the top of a computer-generated list of recipes the consumer can make with the consumer's ingredients. The systems and methods described herein can combine the bids from all auction participants to produce a final ordering of the displayed recipes. Payment may be collected from those producers and merchants who bid on the ingredients of the recipe that was ultimately created by the consumer.

Because embodiments of the systems and methods described herein advantageously allow marketers of a particular brand to target precisely those consumers who have already established that they possesses that brand, the marketing budgets used to influence the consumption of those items may go further. The effectiveness of each marketing budget may be easier to track, and the numbers that measure the effectiveness of the marketing campaign may be more accurate.

Referring now to FIG. 1, a block diagram of a computerized auction system 100 is shown, according to an exemplary embodiment. System 100 further illustrates a process for use with the computerized auction system. The process generally includes receiving a consumer request and producer bids at an operator server. The consumer request and producer bids may be used by the operator server to present the consumer with an ensemble and to receive payment from the producer associated with the producer bids.

System 100 is shown to include a consumer 102 and consumer device 104, one or more producer computers 106, 108, 110, and an operator server 112. System 100 generally facilitates (a) an auction process between operator server 112 and producer computers 106, 108, 110 and (b) a search process between consumer 102 and operator server 112. The auction process and search process depend on one another as described below.

System 100 includes a consumer 102 and consumer device 104. Consumer 102 may access services provided by operator server 112 using consumer device 104. Consumer device 104 may be any type of electronic device (e.g., laptop, desktop, mobile phone, tablet, smartphone, client device, etc.) configured to communicate with operator server 112 via a network (e.g., the Internet, one or more wired or wireless connections may form the network, etc.). Using consumer device 104, the consumer 102 may view a graphical user interface (e.g., served by operator server 112) for entering a request to view a set of ensembles (e.g., recipes) that meet certain constraints (e.g., recipe characteristics provided by consumer 102). The consumer device 104 can communicate (e.g., transmit) the entered request information to the operator server 112.

The consumer 102 can view the ensembles (via consumer device 104) in an order determined by operator server 112 (e.g., in order based on bids placed by the producers), and select one or more of the items for viewing. The operator server 112 may cause ensembles associated with high total bids to be ordered or highlighted for display on consumer device 104 such that the ensembles at the top of the list or highlighted will be more likely to receive consumer 102 consideration. As one example, consumer 102 may be a food consumer who enters one or more keywords or other characteristics (e.g., pasta dish, southwestern food, etc.) in a recipe website via consumer device 104, and is shown a corresponding list of recipes retrieved from operator server 112. The list of recipes may be determined by the operator server 112 as described below. Consumer 102 may select or commit to making one or more of the recipes. The selection may be used by operator server 112 to determine payments owed to bidding producers (e.g., which may be represented by producer computers 106-110).

System 100 is shown to include one or more producer computers 106, 108, 110 connected to operator server 112. Producers may provide bids for one or more components to operator server 112 using producer computers 106-110. Producer computers 106, 108, 110 may be any type of electronic device (e.g., laptop, desktop, mobile phone, tablet, smartphone, etc.) configured to communicate with operator server 112 via a network, wired, or wireless connection. Producer computers 106, 108, 110 may be operated by entities that enter bids on components (e.g., ingredients in the recipe example). The producer computers 106-110 can provide the entered bids to operator server 112. As an example, a producer may be a food and beverage marketer who wishes to promote the consumption of a particular food item. By placing a bid, the producer is both striving to increase the ranking of any recipe that includes the food item as an ingredient, and indicating a willingness to pay an amount per unit of the food item if the recipe is selected and later confirmed to have been consumed.

Operator server 112 and the operator may be an entity that manages the cooperative anonymous auction system and methods described herein. The operator may receive the initial consumer 102 input as described above, retrieves an unordered set of items based on the input (e.g., a set of ensembles such as recipes), orders the items based on the collective bids made by the producers, displays the ordered list to consumer 102 via device 104, records any selections made by consumer 102 at device 104, and collects payment from an appropriate set of producers (e.g., via computers 106-110).

As an example, the operator server 112 may be configured to serve a public-facing website that receives keywords from consumer 102, performs a database search (of ensembles 116) to retrieve matching recipes, orders the recipes based on bids placed by food and beverage marketers (e.g., via producers computers 106-110), displays the ordered set of recipes for consumer 102, records when consumer 102 expresses a commitment to make some of the recipes at device 104, and collects payment from the producers (e.g., by collecting payment from a bank or payment provider, by issuing an invoice to the producer computer, by printing an invoice, by causing an invoice to be mailed, etc.) who had bid on the ingredients in the selected recipes.

In the embodiment of FIG. 1 and the present disclosure, a component (e.g., ingredient, part of a clothing outfit, etc.) may be defined as an item that may be included in an ensemble (e.g., a recipe, a whole outfit or costume, etc.). A generic component may be defined as a component with no brand information or other identification information (e.g., cheddar cheese), while a specified component may be defined as a component with brand information (e.g., cheddar cheese produced by a specific entity). An ensemble may be defined as a specified set of components with specified component quantities (e.g., per serving, in absolute terms, etc.). A generic ensemble may be defined as an ensemble whose components are generic components, and a specified ensemble may be defined as an ensemble whose components are specified components. As one example of a generic ensemble (i.e., having generic components), an ensemble may be a recipe (e.g., a recipe for pizza) and the components of the recipe may be the individual generic ingredients (e.g., pizza sauce, toppings, dough, etc.). As another example of a specified ensemble (i.e., having specified components), an ensemble may be a recipe (a recipe for pizza) and the components of the recipe may be the individual specific ingredients (e.g., Brand A toppings, Brand C dough, Brand B cheese, etc.). While the present disclosure sometimes refers to recipes and ingredients as examples of ensembles and components, it should be understood that the systems and methods described herein may be provided for any type of ensemble which may be made of a combination of components. Further, while the present disclosure describes a process that allows producers to provide bids for specified components, it should be understood that the systems and methods described herein may allow a producer to provide bids for generic component instead or additionally.

Referring further to FIG. 1, a process is shown via the numbered electronic transactions or transmissions. Operator server 112 is shown to receive bids from producer computers 106. Operator server 112 is shown to receive a bid identifying a specified component A (e.g., BrandA cheddar cheese) and a bid price relating to component A from producer computer 106 (step 120). Operator server 112 is shown to receive another bid specifying component A and a bid price relating to component A from producer computer 108 (step 122). Operator server 112 also receives a bid specifying a component B (e.g., BrandA shredded mozzarella cheese) and a bid price relating to component B from producer computer 110 (step 124). Operator server 112 may further receive bids for any number of components (either for specified components as described in the present disclosure, or for generic components) from more producer computers. The process of receiving bids is described in greater detail with reference to FIG. 6.

Component A and component B may be two different types of specified components. As an example, component A may be a first type of product (e.g., a type of cheese such as cheddar) and component B may be a second type of the product (e.g., another type of cheese such as mozzarella cheese). In one embodiment, the producer's bid may be a bid on a specific producer brand on the component (e.g., BrandA cheddar cheese, BrandA shredded mozzarella cheese). In another embodiment, the bids are not brand specific, and may be applied to a generic component and therefore all specified components related to the generic component. The bids provided for component A and component B may be received by operator server 112 and stored (e.g., in a memory device and database of the server) as bids for specified components 118.

Bids for specified components 118 may be used to increase the rank (i.e., as it appears to the consumer in a search) of any generic ensemble including the generic component version of the specified component. For example, if bids for specified component A (e.g., Brand A cheddar cheese) are higher than bids for specified component B (e.g., Brand B mozzarella cheese), then an ensemble containing component A is ranked higher than the same ensemble containing the same amount of component B instead of component A. This ranking is used later on when providing search results to consumer 102.

Referring further to FIG. 1, operator server 112 may receive consumer specified component inventory information (step 126). The specified consumer component inventory may be a set of specified components (e.g., ingredients) in the possession of consumer 102. The specified component inventory may include a list of components, the brand of each component, and the quantity of each component currently held by consumer 102. Operator server 112 may store the specified consumer component inventory information as a specified consumer component inventory 114 within a memory device of operator server 112. The process of a consumer providing a specified component inventory to operator server 112 is shown in greater detail with reference to FIG. 2.

Figure 3:
FIG. 3 is an illustration of a user interface of the computerized auction system illustrating a process of a consumer ensemble search, according to an exemplary embodiment.

Operator server 112 may further receive consumer-desired ensemble characteristics (step 128). The consumer-desired ensemble characteristics may be one or more keywords (e.g., pizza, burgers, tacos, southwestern, American, French, etc.), a number specifying a scalar multiple (e.g., how many servings) of an ensemble, or other ensemble characteristics (e.g., "not spicy", "below 500 calories per serving", etc.). By way of further example, the consumer-desired ensemble characteristics may include the keyword "Italian" (specifying a desire to search for Italian-based food recipes) and a scalar multiple indicating a number of servings of the recipe that the consumer needs. An example of a consumer providing consumer-desired ensemble characteristics is shown in FIG. 3.

Operator server 112 may further provide consumer 102 with a visual presentation of ensembles (step 130). The ensembles may be generic ensembles whose associated specified ensembles (i.e., specified to the consumer's inventory) have the highest combined specified component bid (e.g., based on the bids from the producers) that match consumer-desired ensemble characteristics. In another example, the ensembles may be selected by operator server 112 based on how well the generic ensembles match the consumer-desired ensemble characteristics (e.g., recipes closely related to Italian-based recipes when "Italian" is provided as a keyword), on the current consumer specified component inventory (e.g., recipes that include ingredients that the consumer is in possession of), and on the producer bids on the specified components of the ensembles (e.g., if the specified consumer component inventory includes BrandA cheddar cheese and BrandA shredded mozzarella cheese and bids for BrandA cheddar cheese are higher than bids for BrandA shredded mozzarella cheese, then, all other factors being equal, recipes that include cheddar cheese may be displayed to the consumer first). The generic ensembles may be selected from the list of ensembles having multiple generic components 116. The process of selecting and ordering ensembles for the consumer is described in greater detail in FIGS. 7-9, while a user interface illustrating an example display of ensembles for the consumer is shown in FIG. 4.

Consumer 102 may view the generic ensemble list transmitted to consumer device 104 on an electronic display or another user interface output (e.g., audio output). Operator server 112 may receive an indication of consumption of a generic ensemble (step 132). For example, consumer 102 may select a generic ensemble (e.g., a recipe) and indicate consumption of the generic ensemble (e.g., a confirmation that the consumer has made or will make the recipe) to operator server 112. The generic ensemble includes one or more generic components (e.g., including a generic component of cheddar cheese that corresponds with BrandA cheddar cheese in the consumer's inventory). Referring also to FIG. 5, an example user interface illustrating a selected generic ensemble is shown.

When operator server 112 receives the indication of consumption of a generic ensemble, operator server 112 may then request payment from one or more producer computers 106, 108, 110 if the producer computer submitted a bid for a specified component included by a consumer in the ensemble. If component A was a component associated with a generic component part of the generic ensemble consumed, then operator server 112 may request payment of a bid for consumption of component A from producer computers 106, 108 (steps 134, 136) and not request payment from producer computer 110 (step 138) because component B was not consumed in the generic ensemble. Therefore, the producer pays for consumption of a specified component relevant to the producer.

Referring generally to FIGS. 2-6, various user interfaces for consumer and producer interaction with the operator server are shown, according to exemplary embodiment. The user interfaces of FIGS. 2-6 may allow a consumer and producer to interact with the operator server as described with reference to FIG. 1. In the embodiment of FIGS. 2-6, example ensembles are illustrated as recipes and example components are illustrated as ingredients. As stated above, in other embodiments, the user interfaces of FIGS. 2-6 may be adapted for use for any type of ensemble and components.

Referring to FIG. 2, an illustration of a user interface 200 is shown. The user interface 200 may be configured to allow a consumer (e.g., via the consumer device 104 of FIG. 1) to provide specified component inventory information to the operator server 112 of FIG. 1, according to an exemplary embodiment. Using user interface 200, a consumer may select one or more specified components in the consumer's inventory and provide operator server 112 with the specified component information. While FIG. 2 illustrates specified component inventory information, in another embodiment, user interface 200 may be configured to allow a consumer to provide generic component inventory information.

In user interface 200, the consumer may enter an item in field 202 (e.g., an ingredient) and an amount of the ingredient in the consumer's inventory in field 204. While a text box is shown for item field 202, it should be understood that the consumer may select any item or ingredient to enter in any manner using user interface 200, and may enter an amount in field 204 in any manner as well. Using fields 202 and 204, the consumer may continually build up a list (e.g., an inventory) of specified components in the consumer's inventory. The specified component information may specify the brand or another property of the ingredient.

Further, user interface 200 may provide a display of current items 206. Current items 206 may be a list of items that the consumer has already entered. The consumer may have the option to edit the list of current items 206 (e.g., remove items, change quantities, etc.). User interface 200 may be configured to facilitate the addition, removal, or adjustment of any number of items in the consumer's inventory at any time. The consumer may access user interface 200 at any time and submit a new inventory, and operator server 112 may be configured to automatically update a database storing specified consumer inventory information (see database 718 of FIG. 7).

Referring to FIG. 3, a user interface 300 is shown, according to an exemplary embodiment. User interface 300 is generally configured to allow a consumer to perform a generic ensemble (e.g., recipe) search. The consumer may enter information such as a keyword, component preferences, and other preferences that allow the operator server to select one or more generic ensembles that matches the consumer request. User interface 300 may include a "my pantry" section 302 that allows the consumer to view his or her current inventory while entering recipe search criteria.

User interface 300 includes a search bar 304 that allows the user to enter one or more keywords. The keywords may be representative of a consumer-desired ensemble characteristic. For example, the keyword "Italian" may be representative of all type of Italian dishes, "lasagna" may indicate a preference for lasagna recipes, and so on. Operator server 112 may be configured to use the keywords to select a subset of generic ensembles (e.g., recipes) that are associated with the keywords.

User interface 300 may further allow the consumer to enter any other generic ensemble preferences. For example, in field 306, the consumer may enter the number of servings of a recipe needed (if the consumer is searching for recipes). This may allow operator server 112 to select recipes for which the consumer has enough ingredients, by cross-referencing the search request with the inventory shown in section 302. As another example, in fields 308 and 310, the consumer may further specify specific components or generic components (e.g., ingredients) that the results (e.g., recipes) should include or not include. Operator server 112 may use the information provided in fields 302-310 along with bid information to determine which results to show to the consumer.

Referring to FIG. 4, a user interface 400 is shown. User interface 400 is configured to display the generic ensemble search results. Using user interface 400, operator server 112 may cause search results to be displayed to the consumer in a specified order. For example, search results 402 are shown ranked 1-4. Operator server 112 may use the information provided by the consumer to select a set of recipes, total the bids on each specified component that can be used in each recipe from the producers, and then rank and display the recipes based on the bid total for each recipe.

Search results 402 may include a name of the recipe and the number of servings the recipe is designed to create. Search results 402 may further include a description of the recipe and/or a list of ingredients needed to make the recipe. In one embodiment, the recipe may be adjusted by operator server 112 based on the number of servings requested by the consumer and the ingredients in the consumer's inventory.

The recipes displayed in search results 402 may be generic ensembles (e.g., recipes that are not specified with reference to any particular brands). In other embodiments, the recipes displayed in search results 402 are presented such that the brands in the pantry are injected into the search results. In yet other embodiments, the recipes are displayed in the search results so that the branded components generating the highest bids is injected into the results.

User interface 400 includes a "my pantry" section 302 as described with reference to FIG. 3 and a search result section 402. The consumer may browse all of the recipes listed in user interface 400 and select a recipe to bring up user interface 500 of FIG. 5.

Referring now to FIG. 5, an illustration of a user interface 500 is shown. User interface 500 is configured to display a consumer-selected ensemble. The consumer has selected a recipe for baked spaghetti in this example. User interface 500 is shown to display an ingredient list 502 for the recipe. The consumer should be in possession of enough quantities of each ingredient in his or her pantry to make the suggested number of servings. In another embodiment, the receipt's ingredient quantities may be scaled (up or down) to accommodate the consumer's inventory (e.g., the quantities). User interface 500 is shown to also display directions 504 for creating the recipe (or other relevant directions). User interface 500 may further include any other details regarding the use of the ensemble or any generic or specified component thereof. In one embodiment, generic components are listed in ingredient list 502. In other embodiments, specified components may be listed in ingredient list 502, or the consumer may be given an option as to whether to display specified components or generic components in user interface 500.

The consumer may select the recipe for consumption using button 506. The selection of the recipe may indicate that the consumer intends to create and consume the recipe. The indication may be provided to operator server 112 and used to charge or invoice the producers who submitted bids on one or more ingredients (e.g., specified components) that a consumer may use in the recipe. In another embodiment, a subsequent user action may be used to judge whether or not a participant (i.e., producer) should be invoiced. The subsequent user action that may be used to make this judgment could be, for example, a confirmation that the recipe was made, a calculation of particular component amounts based on serving size, use of the components associated with the ensemble, entry of a review of the recipe, or another user action which indicates that the recipe was used. Once the system receives an indication that the user consumed a recipe, then an automated module may appropriately reduce or remove the proper components from the consumer's inventory. Such a reduction or removal may trigger a reminder or other notice to be provided to the consumer to restock the consumer's inventory.

Referring to FIG. 6, an illustration of a user interface 600 is shown, according to an exemplary embodiment. User interface 600 is configured to allow a producer to submit a bid on a specified component. User interface 600 may generally allow a producer to submit bids on various specified components (and/or generic components) and to view historical data that may be used to determine an optimal bidding strategy.

As mentioned with reference to FIG. 1, the producer may wish to bid on any generic or specified component. For example, if the producer is a marketer of grapes, the producer may be interested in promoting the consumption of grape-like products, such as grape jelly and wine. By promoting consumption of such products, the producer may feel that it will indirectly increase the consumption of their own grapes.

The producer (labeled "Example Brand" in FIG. 6) may enter bids in user interface 600 in bidding section 602. For a given product name 602, the producer may enter a bid amount 604 for a given quantity 606 of the specified component (ingredient in the example of FIG. 6).

For example, assume that Example Brand is a producer of cheese products that may be used in recipes. By submitting a bid on various brands of cheddar cheese, the producer is attempting to promote the use of the recipe, and hence the consumption of cheddar cheese. Referring back to FIG. 6, the producer is shown submitting a $0.02 per ounce (oz) bid on a variety of types of cheese. Finally, the producer may place a bid of $0.01 per oz on a complementary product (ground beef in this example) on the assumption that the consumption of ground beef also encourages the consumption of recipes including cheese that the producer wants to promote.

User interface 600 is further shown to include a historical data section 608. Historical data 608 may be displayed to the producer and used by the producer to make decisions on how much to bid on a specified component (or if to submit a bid at all). In the embodiment of FIG. 6, historical data for the specified component BrandA cheddar cheese is displayed. Historical data 608 may include data about previous bids submitted by the producer, how many times a unit of the specified component has been confirmed consumed during the week, and other analytic data that can be used to the producer's advantage.

The embodiment of FIG. 6 illustrates a user interface in which the producer may submit multiple bids at once across branded components. In various exemplary embodiments, the user interface may differ. For example, the producer may be provided a user interface for each individual product (branded ingredient) and submit a bid on each individual product. In another embodiment, multiple products may be listed on the same user interface, while the producer has the ability to edit, add to, or delete products displayed on the page in any way. Further, while user interface 600 only displays historical data for one product, in other embodiments, user interface 600 may be configured to display historical data for multiple products simultaneously, or may display a comparison between products. For example, historical data may include a comparison between two different brands of cheddar cheese (e.g., which brand is more likely to be owned by a consumer, which brand is more likely to be displayed at the top of a search results page because of bids from other producers, etc.).

Figure 7:
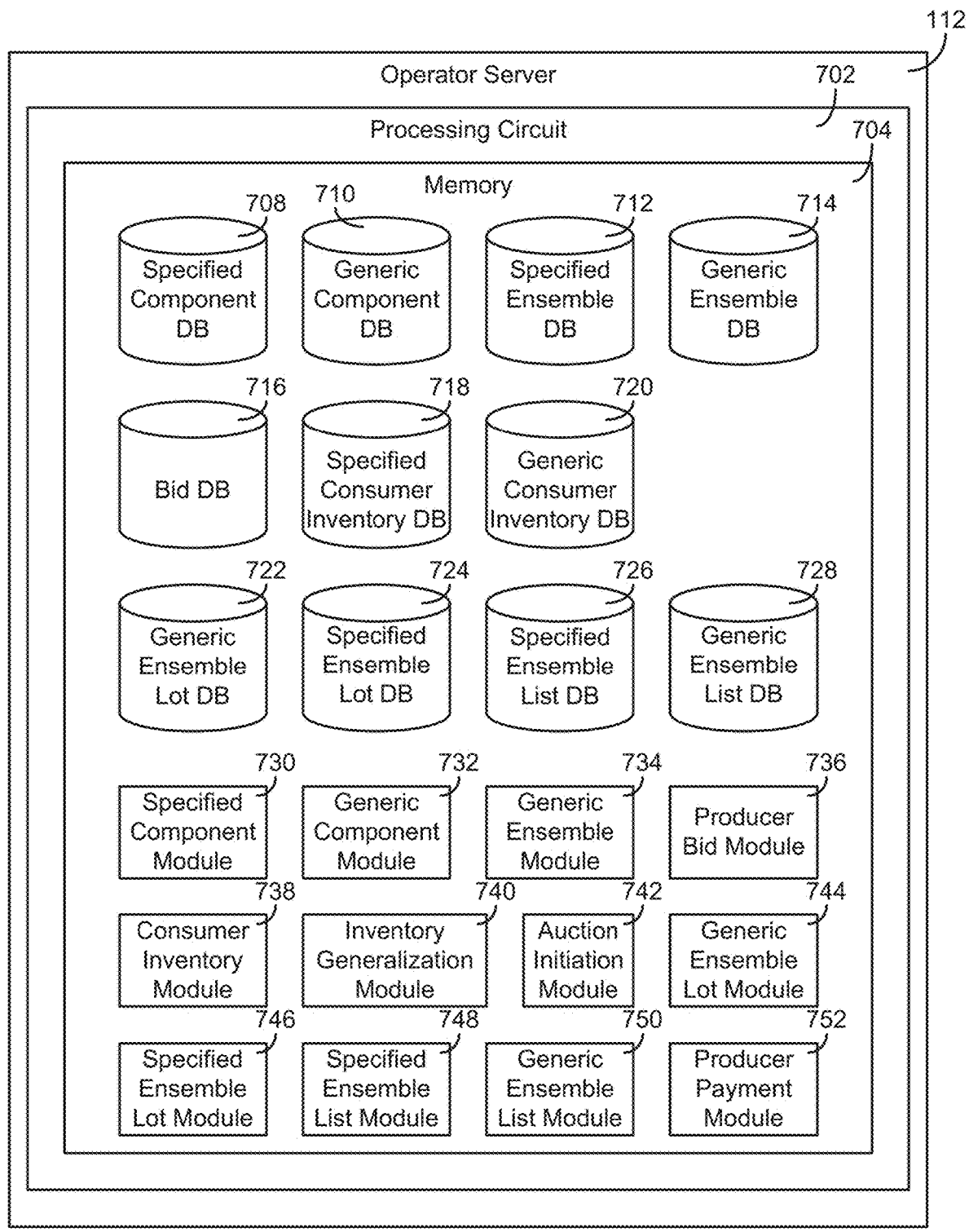
FIG. 7 is a more detailed block diagram of the operator server of the computerized auction system, according to an exemplary embodiment.

Referring to FIG. 7, a more detailed block diagram of operator server 112 is shown. Operator server 112 is shown to include various databases for storing consumer information (e.g., specified consumer inventories), ensemble information (e.g., a list of generic ensembles and generic components for each ensemble), and producer information (e.g., specified component bids). Operator server 112 is further shown to include various modules for executing the systems and methods described in FIGS. 1-6.

Operator server 112 is generally shown to include a processing circuit 702 including memory 704. Processing circuit 702 may include a processor implemented as a general purpose processor, an application specific integrated circuit (ASIC), one or more field programmable gate arrays (FPGAs), a group of processing components, or other suitable electronic processing components. Memory 704 is one or more devices (e.g., RAM, ROM, Flash memory, hard disk storage, etc.) for storing data and/or computer code for completing and/or facilitating the various processes described herein. Memory 704 may be or include non-transient volatile memory or non-volatile memory. Memory 704 may include database components, object code components, script components, or any other type of information structure for supporting the various activities and information structures described herein. Memory 704 may be communicably connected to the processor and includes computer code modules for executing one or more processes described herein.

Operator server 112 includes a specified component module 730. Specified component module 730 is configured to establish a set of specified components C to store in specified component database 708. Specified component module 730 may cause the generation of one or more user interfaces for allowing a producer to enter or otherwise define a specified component. A specified component may be defined as an item on which a producer may place a bid in order to increase the rank of any ensemble containing the item. Further, specified component database 708 may store information about each specified component (e.g., a name, brand, quantity, UPC code, description, etc.). As an example, any branded food item (e.g., a brand of cheddar cheese) may be classified as a specified component, and the name, brand, quantity available of the food item, UPC code of the food item, and a description of the food item may be stored in specified component database 708. Specified component module 730 may establish the set of specified components C as a preliminary step, according to an exemplary embodiment. With respect to the bids and user consumptions, a quantity value is mentioned in this disclosure. Quantity may be any nonnegative number attached to a (possibly null) unit. The set of quantities may be denoted Q. Examples of quantities include 2; 4.5 oz; 1 loaf, 6 servings, etc.

Operator server 112 includes a generic component module 732. Using specified component database 708, generic component module 732 may define the equivalence class of the specified components, creating a database 710 of generic components C. In other words, generic component module 732 creates a generic component database 710 that relates families of branded components that can be used for the same generic ensemble. A generic component may be defined as an equivalence class of specified components that can be substituted for one another (e.g., different brands of cheddar cheese). There is a natural function ($\pi$: C→$\overline{C}$) that can map the specified component to the generic component it represents. In other words, the function $\pi$ maps, for example, different brands of cheddar cheese to the generic component cheddar cheese. As an example, if specified component database 708 includes information for three different brands of cheddar cheese, generic component module 732 creates a database entry in generic component database 710 that relates the three brands of cheddar cheese to the generic food type of cheddar cheese. In one embodiment, the mapping of specified components to generic components may be made independently of operator server 112 (e.g., having one or more users of operator server 112 provide specified and generic component information used for the mapping. For example, a user may provide a list of specified components (e.g., BrandA cheddar cheese, BrandB cheddar cheese) that should be mapped to a generic component (e.g., cheddar cheese).

Operator server 112 includes a specified ensemble database 712 configured to store information relating to specified ensembles. A specified ensemble e may be defined as a set of specified components with specified quantities. As an example, a specified ensemble may be a recipe for a tray of lasagna, whose ingredients include a particular amount and brand of parmesan cheese, an amount and brand of beef, and other such ingredients. A specified ensemble e may be represented as a mapping that maps each specified component to a quantity:

$$e: C \rightarrow Q.$$

This mapping maps each specified component to the quantity of the component.

Figure 8A:
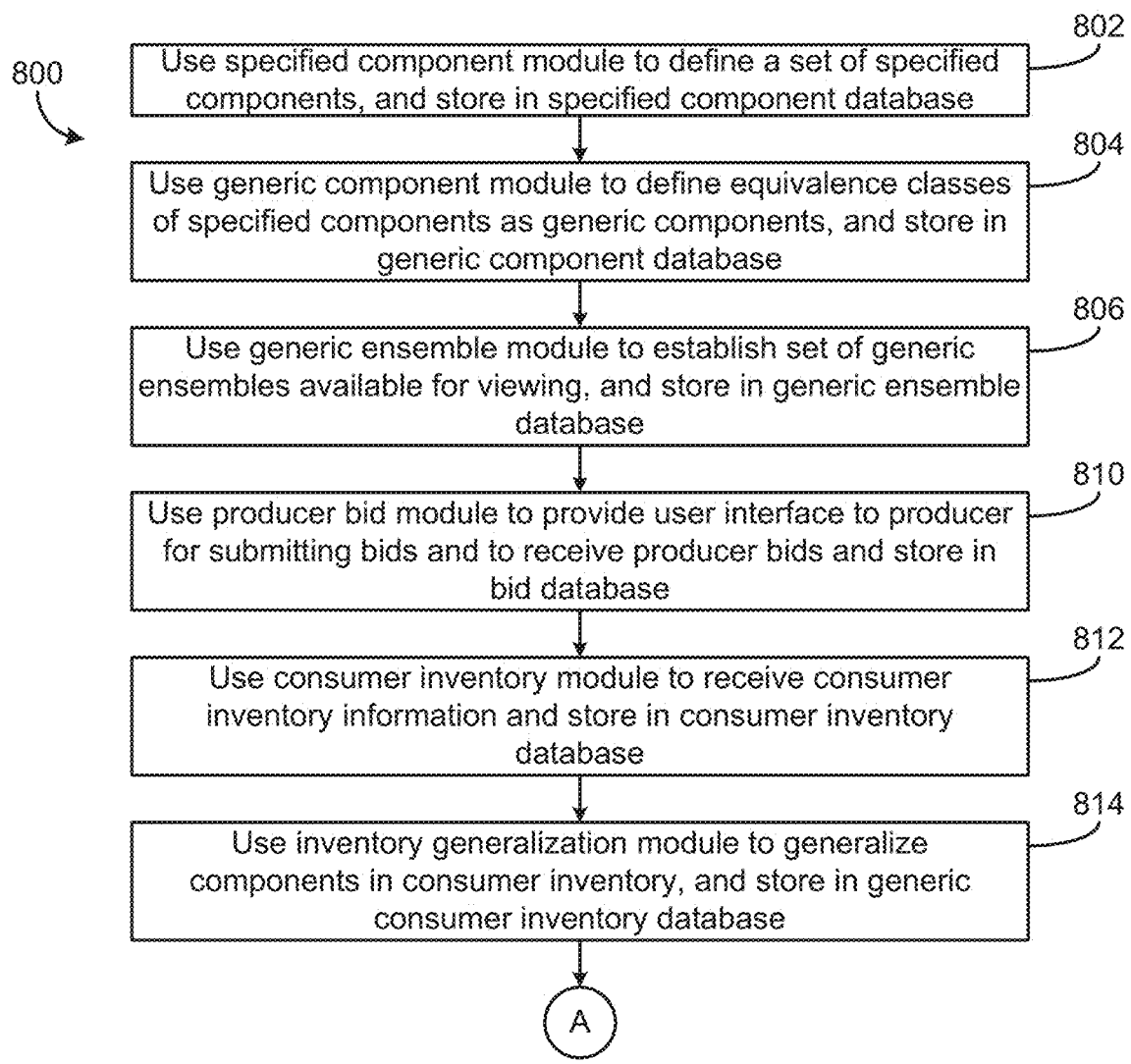
FIGS. 8A-B are flow charts of a process illustrating an auction process of the computerized auction system, according to an exemplary embodiment.
Figure 8B:
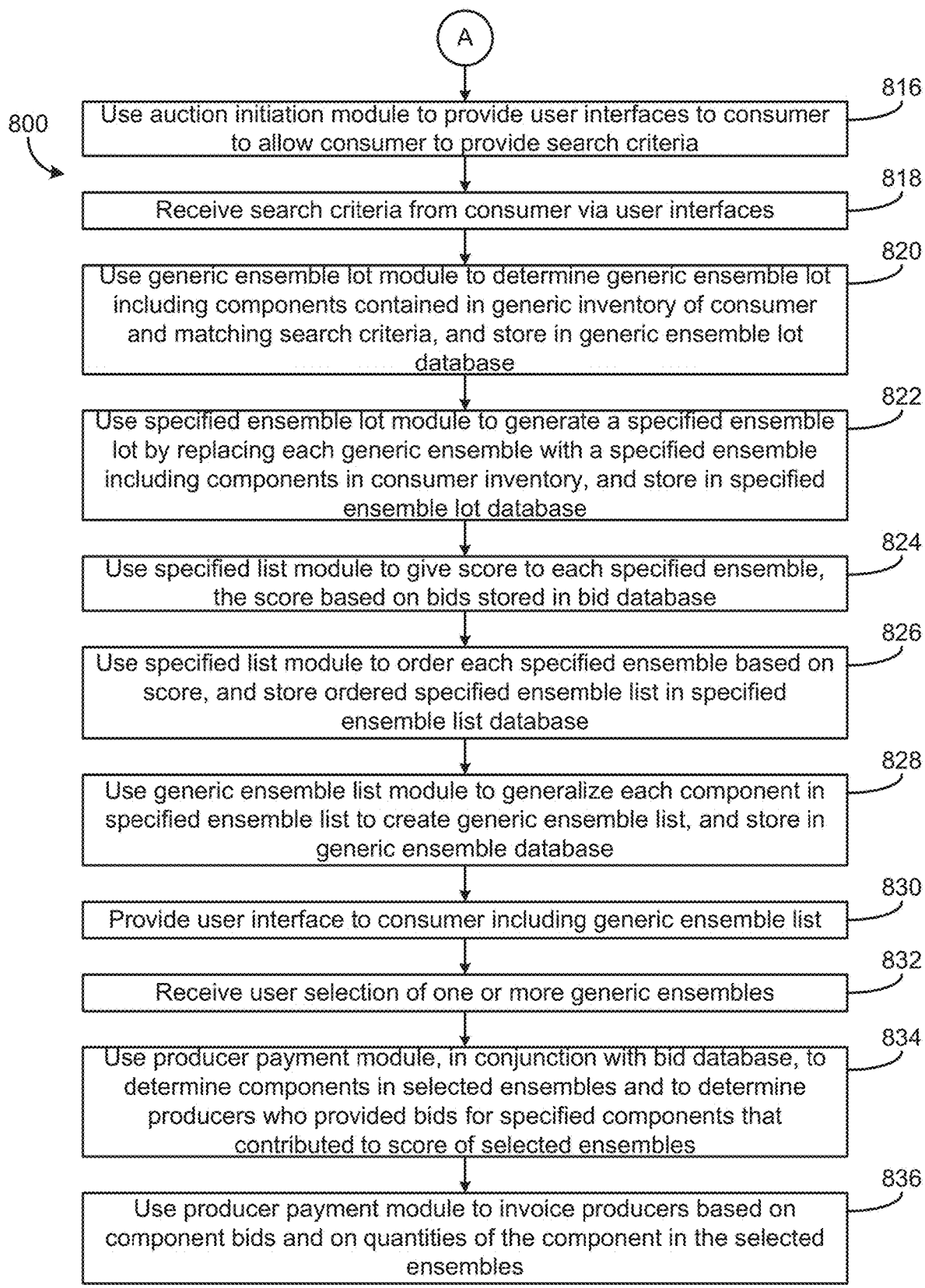

The set of all specified ensembles E may be shared with the consumer and producer, and may be determined by any party authorized to create the specified ensembles. The specified ensembles of database 712 may be formed from the generic ensembles established by generic ensemble module 734 (described below) by replacing the generic components in each generic ensemble with a specified component. The set of all specified ensembles E may evolve over time. In some embodiments, specified ensemble database 712 does not actually exist in memory 704. Rather, in such embodiments, specified ensembles are determined using relationships between generic ensemble database 714 and specified component database 708. In the process of FIGS. 8A-B, such an embodiment is shown and described.

Operator server 112 includes a generic ensemble module 734. Generic ensemble module 734 is configured to establish a set of generic ensembles $\overline{E}$ available for viewing by a consumer and producer. Generic ensemble module 734 may store the set of generic ensembles $\overline{E}$ in a generic ensemble database 714. A generic ensemble may be defined as a set of generic components with specified quantities (e.g., quantity per serving). A generic ensemble may be thought of as a function that maps each generic component to a quantity Q:

$$g: \overline{C} \rightarrow Q$$

Each specified ensemble e may be associated with a generic ensemble $\overline{e}$ by replacing each generic component of the generic ensemble with the corresponding specified component. For an ensemble e∈E, the associated generic ensemble $\overline{e} \in \overline{E}$, it may be represented functionally as:

$$\overline{e}: \overline{C} \rightarrow Q,$$

$$\overline{c} \mapsto \sum_{c \in \pi^{-1}(\overline{c})} e(c).$$

As an example, a generic ensemble may be a recipe for a tray of lasagna specifying a quantity but not a brand of parmesan cheese, a quantity but not a brand of ground beef, and other such ingredients.

Operator server 112 includes a producer bid module 736. Producer bid module 736 may present user interfaces to a producer (i.e., producer device) for facilitating the entry and editing of producer bids. Producer bid module 736 is configured to receive producer bids and to store the bids in a bid database 716. Producer bid module 736 may further manage interaction between operator server 112 and the producers (e.g., providing an interface that the producer may use to submit bids).

A bid may be a value assigned by a producer (e.g., a bidder) to a fixed quantity of a specified component. Where B represents the set of producers, the set of all bids may be represented as a function that maps each combination of producer and specified component to an amount of money (or other nonnegative number representative of value) as such:

$$\beta: B \times C \rightarrow R_{\geq 0}.$$

The mapping assumes a fixed unit of the specified component associated with a bid. The bids made by a given producer b may be represented by the function:

$$\beta_b: C \rightarrow R_{\geq 0}.$$

In some embodiments, there is no implied restriction to the components (either specified or generic) on which a producer may place a bid (e.g., the producer may bid on any specified component other than their own). As an example, a producer of a particular brand of cheddar cheese may place a bid of $0.02 on ground beef. While in some embodiments the producers can place bids on generic components, in other embodiments the producers only place bids on brand-specific components. In yet other embodiments, the producers can place bids on a mix of generic and brand-specific components.

On an ongoing basis, each producer may place a bid on a unit quantity of any specified component. The producer may make the bid guided by analysis of historical data. If a producer does not place a bid on a specified component, operator server 112 may make this the equivalent of a zero bid on the specified component for the producer. The bid should reflect the producer's desire to have any customer in possession of the specified component consume the specified component. The bid should presumably take into account profit margins and other costs to the producer.

Operator server 112 includes a consumer inventory module 738. Consumer inventory module 738 may be configured to cause graphical user interfaces for managing inventory of specified components to be displayed to a consumer at a consumer device. The consumer inventory module 738 may be configured to receive consumer inventory information and to store the information in a specified consumer inventory database 718. Consumer inventory module 738 may further manage interaction between operator server 112 and the consumer (e.g., providing an interface that the consumer may use to submit the inventory information). In practice, a consumer may specify the specified consumer inventory, in other embodiments, another entity may establish a specified consumer inventory for use by operating server 112.

A specified consumer inventory may be a set of specified components in specific quantities. A specified consumer inventory i may be represented as a function mapping each specified component to a quantity:

$$i: C \rightarrow Q.$$

Even though inventories and ensembles have identical functional definitions, they are used differently. The specified consumer inventory i is used by operator server 112 to restrict the set of generic ensembles available to the consumer. As an example, a specified consumer inventory may be a set of food items, with specified brands and in specific quantities, found in a given consumer's pantry.

Operator server 112 includes an inventory generalization module 740. For a consumer's inventory stored in specified consumer inventory database 718, inventory generalization module 740 may generalize the inventory (e.g., forgetting the brand associated with each specified component in the specified consumer inventory). For example, instead of referring to BrandA cheddar cheese in the specified inventory, it is simply referred to as cheddar cheese. Every time the consumer specified inventory is modified (done by consumer inventory module 738), operator server 112 may be configured to generalize the specified inventory with inventory generalization module 740. The generalized inventory is then stored in generic consumer inventory database 720.

A generic inventory may be a set of generic components with specific quantities. Formally, a generic inventory $\bar{i}$ may be represented as a function from the set of generic components to the set of quantities:

$$\bar{i}: \bar{C} \to Q$$

For each specified inventory i, a generic inventory $\bar{i}$ is formed by replacing each specific component in the domain with the generic component it represents. The generic inventory may be defined as:

$$\bar{i}: \bar{C} \to Q,$$
$$\bar{c} \mapsto \sum_{c \in \pi^{-1}(\bar{c})} i(c).$$

As an example, the set of categories of food ingredients, in specific quantities but ignoring the brands, found in a pantry of the consumer, may be defined as the generic inventory of the consumer.

Modules 730-740 may generally be program code modules used by operator server 112 to provide preliminary database population and maintenance functions (e.g., functions executed before an auction process or consumer search process is started). Operator server 112 further includes program code modules 742-752 that may be executed after receiving a search request from a consumer or bids from a producer.

Operator server 112 includes an auction initiation module 742. Auction initiation module 742 is configured to cause user interfaces to be shown to a consumer (e.g., on a consumer device). The user interfaces may be configured to prompt for and receive search criteria from a consumer (e.g., a recipe search request), and use the search criteria to selecting generic ensembles (e.g., recipes) to display to the consumer via a user interface. The search criteria in the indication may include one or more keywords, a scalar multiple representing an amount of an ensemble to provide in the search results (e.g., number of servings of a recipe), and other search parameter information, as shown in the example of FIG. 3. An example indication may include the keyword "Italian", the list of ingredients in the consumer's inventory, and an indication that the consumer needs a recipe that serves six. Auction initiation module 742 may further be configured to provide an interface (e.g., user interface 300) to allow the consumer to provide the search characteristics.

Operator server 112 includes a generic ensemble lot module 744. A generic ensemble lot may generally be defined as an unordered set of generic ensembles. One example of a generic ensemble lot is a set of recipes from a chapter in a recipe book, in which no ingredient has a specified brand. As another example, an unordered set of recipes that includes "chicken" as an ingredient (with no mention of brands) is a generic ensemble lot.

Upon receiving the consumer's query at module 742, generic ensemble lot module 744 may use the generic inventory of the consumer from database 720 to determine a set of generic ensembles (stored in generic ensemble database 714) that use only generic components from the generic inventory of the consumer, also taking into account the quantities of each generic component required by the generic ensembles and the quantities of each generic component in the consumer's inventory. The set of generic ensembles that fit the criteria is a generic ensemble lot and may be stored in generic ensemble lot database 722. For a given generic inventory $\bar{i}$, the generic ensemble lot may be represented as:

$$\text{Generic Ensemble Lot} = \{g \in \bar{E} | g(\bar{c}) \leq \bar{i}(\bar{c}) \forall \bar{c} \in \bar{C}\}.$$

In other words, the generic ensemble lot is a collection of generic ensembles for which the quantity of each generic component in the generic ensemble is less than or equal to the quantity of that component in the consumer's generic inventory, for all components. Using the recipe and ingredient example, when a search query is submitted by a consumer, the recipe database (e.g., database 714) is searched to produce an unordered set of all recipes the consumer may make that match the search parameters and the specified consumer inventory.

Operator server 112 includes a specified ensemble lot module 746. A specified ensemble lot may generally be defined as an unordered set of specified ensembles. One example of a specified ensemble lot of a chapter from a recipe book in which each ingredient has a specified brand. A set of recipes displayed on a recipe website, where the order is irrelevant, and where each ingredient refers to a branded food item in the website user's pantry, is another example of a specified ensemble lot.

Using the generic ensemble lot stored in database 722, specified ensemble lot module 746 may generate a specified ensemble lot by replacing each generic ensemble g in the generic ensemble lot with some combination of specified ensembles that represent g, using specified components present in the consumer specified inventory. In other words, if cheddar cheese is a generic component in a generic ensemble, and the consumer is in possession of BrandA cheddar cheese, then BrandA cheddar cheese replaces cheddar cheese in the specified ensemble. The generic inventory is assured to have an adequate supply of specified components for each ensemble based on the generic ensemble lot definition above (e.g., as may be enforced by one or more inventory management and checking features).

The consumer inventory may contain more than one specified component $\{c_1, c_2, \ldots\}$ that represent the same generic component $\bar{c}$ (e.g., BrandA cheddar cheese and BrandB cheddar cheese for cheddar cheese) required by a generic ensemble in the generic ensemble lot. In such a case, when the specified ensemble lot is formed, the generic component $\bar{c}$ should get replaced by a weighted combination of specified components $\{c_1, c_2, \ldots\}$. Represented formulaically, a generic ensemble g and specified inventory i give rise to a specified ensemble e where the quantity of each specified component $c \in \pi^{-1}(\bar{c})$ in the specified ensemble e is given by, for example:

$$e(c) = \frac{\min\{i(c), g(\bar{c})\}}{\sum_{c \in \pi^{-1}(\bar{c})} \min\{i(c), g\{\bar{c}\}\}} \cdot g(\bar{c}).$$

In other embodiments, the combination of specified components $\{c_1, c_2, \ldots\}$ may be weighted using any other formula, or may be weighted based on any type of consumer, producer, or operator server preference.

In another embodiment, the specified components from the consumer's inventory to be used in a specified ensemble are combined in such a way that their combined bid total (i.e., spanning multiple producers) is maximized. If there is a not a unique maximizing combination of these specified components, then among all such maximizing combinations, a tie-breaking algorithm may be employed. A tie breaker, for example, may be to give as much weight possible to the specified component which was acquired earliest. In such an embodiment each specified component in the consumer's inventory may have a unique timestamp indicating its time of acquisition. In other examples, the expiration dates of components may be tracked and components expiring first may be weighted higher.

In other words, a combination of all specified components for a given generic component may be used. The generic ensemble lot generated by a consumer's query may completely determine a specified ensemble lot. The operator maintains an unordered set of all recipes (i.e., ensemble lot) a consumer (i.e., website user) can make from ingredients in his possession, with the ingredient brands known explicitly. This set will be used calculate the ranking score for each recipe, based on the bids that have been placed on each recipe's constituent ingredients. This set may not yet be displayed to the consumer.

As an example of the stated formula for e(c) provided above, if the set of recipes determined by the consumer's search criteria contains a recipe that requires 8 ounces of cheddar cheese, and the consumer user is in possession of 3 ounces of BrandA cheddar cheese and 7 ounces of BrandB cheddar cheese, then according to the formula above, 2.4 ounces of BrandA cheddar cheese and 5.6 ounces of BrandB cheddar cheese will be designated for use by that recipe. The consumer does not have to abide by this designation. Rather, this designation will be used only to give that recipe a score based on the bids on each ingredient. In other embodiments, the consumer user is asked to abide by the designation in return for some incentive (e.g., coupon).

Specified ensemble lot module 746 may further store the specified ensemble lot in a specified ensemble lot database 724 for use by further modules.

Operator server 112 includes a specified ensemble list module 748. A specified ensemble list is an ordered set of ensembles. In particular, it is an ordering of a specified ensemble lot (stored in database 724). Operator server 112 uses bids to produce the specified ensemble list from the specified ensemble lot. Operator server 112 may store the specified ensemble list in specified ensemble list database 726.

Specified ensemble list module 748 is configured to give a score to each specified ensemble in the specified ensemble lot to determine an ordering of the ensemble lot, thereby producing an ensemble list for presenting to a consumer in response to a search. The score given to an specified ensemble is the sum of all bids placed on the constituent specified components in their specified quantities. Specifically, for each pair of a producer b (e.g., a bidder) and a specified component c in a specified ensemble e, module 748 identifies the bid placed by the producer b on specified component c and scales the bid by the quantity of specified component c in the specified ensemble e. All such bids for all producers and specified components are then summed together. Formally, the score may be represented as:

$$\rho(e) = \sum_{c \in C} \sum_{b \in B} \beta(b, c) \cdot e(c).$$

Continuing the example above in which it was determined that the consumer should use 2.4 ounces of BrandA cheddar cheese and 5.6 ounces of BrandB cheddar cheese, suppose further that a first producer has placed a bid of $0.02 per ounce on BrandA cheddar cheese and a second producer has placed a bid of $0.04 per ounce of BrandB cheddar cheese. Then the total bid on cheddar cheese in this recipe is obtained by forming the weighting each bid by the quantity present in the recipe, and summing over all bids: $0.02*2.4+$0.04*5.6=$0.048+$0.224=$0.272 . . . .

The set of specified ensembles in the specified ensemble lot may then be ordered based on their score, from greatest to least. The resulting specified ensemble list order may then be used to present generic ensembles to the consumer by module 750 (e.g., in an order such as shown in user interface 400 of FIG. 4), described below.

Specified ensemble list module 748 may be configured to resolve ties in scores if necessary. As one example, if two or more specified ensembles receive the same score, the specified ensembles may be ordered according to the number of specified components represented in each specified ensemble, with the most abundant receiving the higher rank. As another example, the specified ensembles may be ordered by the timestamp of the latest contributing bid, with the earliest such "latest bid" receiving a higher rank.

Operator server 112 includes a generic ensemble list module 750. A generic ensemble list may be an ordered set of generic ensembles. In particular, it is an ordering of a generic ensemble lot, such as a generic ensemble lot stored in database 722. The ordering may be made based on the set of bids provided by producers. Operator server 112 may store the generic ensemble list in generic ensemble list database 728.

Generic ensemble list module 750 uses the specified ensemble list stored in database 726 and generalizes the specified ensembles in the list to generic ensembles. This generic ensemble list is then the list presented to the consumer in, for example, user interface 400. Of course, in this case, each recipe can be made from what is already in the specified consumer inventory, and the recipes appearing toward the top include ingredients which are most strongly being promoted, as measured by the bids.

More particularly, with the ordering of the specified ensembles determined by module 748, the branding information in each specified ensemble is stripped from the individual specified components of the specific ensemble. Each resulting generic ensemble will be able to be made by the consumer based on the specified components in the consumer inventory, and the generic ensembles appearing towards the top of the display are the ones whose specified components corresponding with the generic components of the generic ensembles are being collectively most strongly promoted by producers, as measured by the bids. Within the operator server, however, each generic ensemble in the list is still associated with the corresponding specific ensemble.

Operator server 112 includes a producer payment module 752. After displaying the generic ensemble list to the consumer at module 750, the consumer may select one or more of the generic ensembles in the list, with the quantities scaled based on the specified consumer inventory, number of servings needed, or other scaling factors. When the consumer selects the generic ensembles (e.g., as described in user interface 500 of FIG. 5), producer payment module 752 may invoice the producers whose bids contributed to the aggregate bid of each of the selected generic ensembles. Producer payment module 752 may use specified ensemble list database 726 and generic ensemble list database 728 to determine which producers to invoice. Since each generic ensemble is associated with a specified ensemble that specifies brands that the producers bid on, producer payment module 752 can identify which producers to invoice. The invoice for a given producer is the producer's contributing bid for the specified ensembles, multiplied by a scalar indicated by the consumer (e.g., by the number of servings the consumer indicated).

Functionally, for a given specified ensemble lot e and a set of per-component scalars s(c), producer b pays the operator server:

$$\sum_{e \in \varepsilon} \sum_{c \in C} \beta(b, c) \cdot e(c) \cdot s(c).$$

Operator server 112 may be configured, upon consumer selection of the ensemble as described with reference to module 750, to update the specified and generic consumer inventories in databases 718, 720. For example, the quantity of each generic component to be consumed in the generic ensemble may be deducted from the generic consumer inventory in database 720, or from the specified consumer inventory in database 718 if the brand of the consumed specified component is known.

Referring now to FIG. 8A-B, a flow chart of a process 800 for providing an auction process of the computerized auction system is shown, according to an exemplary embodiment. Process 800 may be executed by, for example, the modules of operator server 112 as described above. Process 800 may include steps (e.g., steps 802-814 shown in FIG. 8A) that may be considered preliminary steps for an auction process of the operator server, and steps (e.g., steps 816-836 shown in FIG. 8B) which are part of the actual auction process for a given consumer and consumer request.

Process 800 includes defining a set of specified components (step 802). The set of specified components may be defined by, for example, specified component module 730. In one embodiment, the specified component module may cause a GUI for entering the set of specified components to be displayed on a client device or display in communication with the operator server. In another embodiment, the specified component module may process an existing list of specified components either stored by the operator server or received from an outside source. The set of specified components may be components that a producer may bid on later in the auction process. For example, the set of specified components may be a list of ingredients, including brand information of the ingredients. Step 802 may include storing the specified component information in a database (e.g., database 708).

Process 800 includes defining equivalence classes which relate the specified components as generic components (step 804). The generic components may be defined by, for example, generic component module 732. In one embodiment, the generic component module may cause a GUI for entering and defining generic components to be displayed on a client device or other display in communication with the operator server. For example, the GUI may be provided that allows a user to identify equivalence classes for the operator server. In another embodiment, the generic component module may use previously existing information about equivalences between specified components and generic components either stored by the operator server or received from an outside source. Step 804 may generally include defining the equivalence classes of the specified components by determining specified components that can be substituted for one another in an ensemble. For example, if there are three known brands of cheddar cheese defined in step 802, a generic component may be identified as "cheddar cheese" by step 804. Each of the three brands of cheddar cheese may be identified as being a "cheddar cheese" type of generic component. Step 804 may include storing the generic components in a database (e.g., database 710).

Process 800 includes establishing a set of generic ensembles available for viewing (step 806). The set of generic ensembles may be established by, for example, generic ensemble module 734. In one embodiment, the generic ensemble module may cause a GUI for allowing specified ensemble and generic ensemble information to be provided to be displayed on a client device or other display in communication with the operator server. In another embodiment, the generic ensemble module may prepare a set of generic ensembles without any user input. Step 806 may generally include accessing a set of generic ensembles provided by any entity (e.g., a consumer, producer, or third party otherwise not associated with the auction process). The set of generic ensembles may be used by the operator server throughout the rest of the auction. As an example, a set of generic ensembles may be recipes created by and submitted by a consumer or producer, a set of recipes in a cookbook or other source. Step 806 may include storing the specified ensembles in a database.

Process 800 includes providing a user interface to the producer for submitting bids and receiving producer bids for specified components (step 810). A producer bid module 736 or other module may be configured to provide the user interfaces to the producer via a remote device. The user interfaces may allow a producer to submit bids on specified components and to view historical information and other information about the specified components or previous bids. The bids may be placed by the producers on individual specified components. A bid on a particular specified component may be generally representative of the producer's desire to have a consumer in possession of the specified component consume the specified component. The bids may be stored in a bid database for further use by auction process 800 (e.g., database 716).

Process 800 includes receiving consumer inventory information (step 812). A consumer inventory module 738 or other module may be configured to provide a user interface to allow a consumer to provide the specified consumer inventory information. The user interfaces may allow a consumer to enter specified consumer inventory information by allowing the consumer to select or input one or more specified components and to specify a quantity for each selected or inputted specified component. The specified consumer inventory information may generally include a list of specified components in the consumer's possession and a quantity of each specified component. The specified consumer inventory information may be stored in a specified consumer inventory database for further use by auction process 800 (e.g., for determining a generic consumer inventory and the set of generic ensembles that can be made by the consumer).

Process 800 includes generalizing components in the consumer inventory (step 814). The components may be generalized by, for example, inventory generalization module 740. In one embodiment, the inventory generalization module may cause a GUI for entering generic component information for a specified component to be displayed on a client device or other display in communication with the operator server. In another embodiment, the inventory generalization module may generalize each component in the specified consumer inventory upon receiving the consumer inventory at step 812 without further consumer input. Each specified component in the consumer inventory may be a branded component (e.g., BrandA cheddar cheese), and step 814 may include associating the branded component with the equivalent generic component (e.g., cheddar cheese). The generic consumer inventory information may be stored in a generic consumer inventory database for further use by auction process 800 (e.g., database 720). For example, such information may be used by process 800 to determine which ensembles (e.g., recipes) to show a consumer.

Referring generally to steps 802-814, process 800 establishes the following information that can be used by the operator server in the actual auction process: ensembles that may be presented to a consumer, producer bids that may be used to determine which ensembles to show to the consumer and in what order, and a consumer inventory that may be used to determine which ensembles may be created by the consumer and therefore are presentable to the user. Throughout steps 802-814, the various modules of the operator server may be configured to provide various user interfaces that allow the producer and consumer to enter any type of information about the ensembles, components, and inventory.

Process 800 includes providing user interfaces to the consumer to allow the consumer to provide search criteria (step 816). An auction initiation module 742 or other module may be configured to provide the user interfaces to the consumer. The search criteria may then be received via the user interfaces (step 818). The search criteria may include one or more keywords, a scalar multiple indicating an amount of an ensemble the consumer needs, and other search parameters. For example, search criteria for a recipe website may include the keyword "Italian" and an indication that a recipe that feeds six people is needed.

Process 800 includes determining a generic ensemble lot (e.g., an unordered set of generic ensembles) including components contained in the generic inventory of the consumer and matching the search criteria (step 820). The generic ensembles may be selected by, for example, generic ensemble lot module 744. The generic ensemble lot module may be configured to match the one or more keywords or other properties in the search criteria to one or more generic ensembles. For example, if the keyword is "Italian", recipes for spaghetti, lasagna, and other such recipes may be selected. The generic ensemble lot module may be configured to generate keyword information for the generic ensembles to match to the search criteria, in one embodiment. Further, the component list for each generic ensemble may be compared to the generic inventory of the consumer. If the consumer has enough of each component in the generic ensemble in the generic inventory, then the generic ensemble may be selected at this step. Otherwise, the generic ensemble may not be selected. For example, if the consumer does not possess or have enough ground beef in his or her generic inventory, recipes that include ground beef as an ingredient may be omitted at this step. The generic ensembles may be stored in a database for further use by auction process 800 (e.g., database 722), or may be instantly processed as described in subsequent steps.

Process 800 includes generating a specified ensemble lot (e.g., an unordered list of specified ensembles) by replacing each generic ensemble with a specified ensemble (step 822). The specified ensemble lot may be generated by, for example, specified ensemble lot module 746. The specified ensemble lot module may be configured to select specified ensembles that match up with a generic ensemble and that includes components in the specified consumer inventory. For example, if a generic ensemble includes cheddar cheese, step 822 includes checking the specified consumer inventory to determine what brands of cheddar cheese the consumer is in possession of, and assigns a quantity of each of the one or more brands of cheddar cheese to the generic ensemble to create the specific ensemble. In one embodiment, this resulting specified ensemble may not be presented to the consumer at any point; the specified ensemble may simply be used to assign a score to the associated generic ensemble as described in step 824. In another embodiment, this resulting specified ensemble may eventually be presented to the consumer for selection. The specified ensembles may be stored in a database (e.g., database 724).

Process 800 includes giving a score to each specified ensemble (step 824). The score may be based on bids on each specified component stored in the bid database. The score may be assigned by, for example, specified ensemble list module 748. The specified ensemble list module may be configured to look up bids on each specified component in the specified ensemble, and to sum all bids for all specified components. The sum of all specified components for a specified ensemble may constitute the score for the specified ensemble.

Process 800 includes ordering each specified ensemble based on the score (step 826). Step 826 may further include storing the ordered specified ensemble list in a database (e.g., database 726). The step of ordering the specified ensembles into a specified ensemble list may be executed by, for example, specified ensemble list module 748. As a result of step 826, the operator server may have an ordered list of specified ensembles, with the specified ensembles at the top of the list being the specified ensembles whose specified components received the highest bids from the producers. This list is representative of the collective producers' desires to have a consumer consume the ensemble including the specified components.

Process 800 includes generalizing each specified component in the specified ensemble list to create a generic ensemble list (step 828). Step 828 may further include storing the ordered generic ensemble list in a database (e.g., database 728). Step 828 may be executed by, for example, generic ensemble list module 750. The generic ensemble list module may be configured to generalize each individual specified component in each specified ensemble. By generalizing each specified component, but maintaining the order of the list, the generic ensemble list module generates a list of generic ensembles, with no brand information, that can be presented to the consumer for selection. For example, this resulting list may be a list of recipes with generic ingredients listed, but the recipes at the top of the list are recipes whose specified components were bid on the most by the producers. Since the bids were applied based on the specified consumer inventory, the list of recipes is ordered based on the collective producers' desires to see the consumer consume one or more particular ingredients of the recipe.

Process 800 includes providing a user interface to the consumer including the generic ensemble list (step 830) and receiving the user selection of one or more of the generic ensembles (step 832). The user interfaces may be provided by any of the modules described herein configured to provide such user interfaces to the consumer. For example, the generic ensemble list module, after generating the generic ensemble list, may generate a GUI configured to display the list to the consumer on a client device. The GUI may allow the consumer to further select one or more of the generic ensembles. The selection of a generic ensemble may be an indication that the user intends to create the and consume the generic ensemble. In another embodiment, at steps 830 and 832, the user interface may include a specified ensemble list, and a user selection of one or more of the specified ensembles may be received.

Process 800 includes determining components in the selected generic ensembles and determining producers who provided bids for specified components that contributed to the score of the selected generic ensembles (step 834). A producer payment module 752, in conjunction with bid database 716, or other module may be configured to determine components in the generic ensembles, determine specified components in the specified consumer inventory that can be used in the generic ensembles, and determine producer bids for each of the specified components. For example, assume that the consumer selected a spaghetti recipe with cheddar cheese included. Step 834 includes identifying cheddar cheese as a generic component to be consumed, and identifying the one or more associated brands of cheddar cheese (e.g., specified components) in the specified consumer inventory, along with the amount of cheddar cheese used for each brand. Step 834 may then include, for each brand of cheddar cheese, determining all producer bids for the brand of cheddar cheese. For example, two different produces may have bid on BrandA cheddar cheese.

Process 800 includes invoicing the producers based on component bids and on quantities of the generic component in the selected ensembles (step 836). Using the example from step 834, assume the consumer had 5 oz of BrandA cheddar cheese and 3 oz of BrandB cheddar cheese. If a producer had bid $0.02 per oz of BrandA cheddar cheese and $0.03 per oz of BrandB cheddar cheese, the producer may be charged a total of $0.19. A producer payment module 752 or other module may be configured to handle invoicing the producers and calculating an amount to charge a producer upon selection of an ensemble by a consumer. For example, the producer payment module may cause a GUI for displaying an invoice to the producer to be displayed on a client device or other display. Further, the producer payment module may cause a GUI for allowing a producer to provide payment information to the operator server to be displayed.

Figure 9:
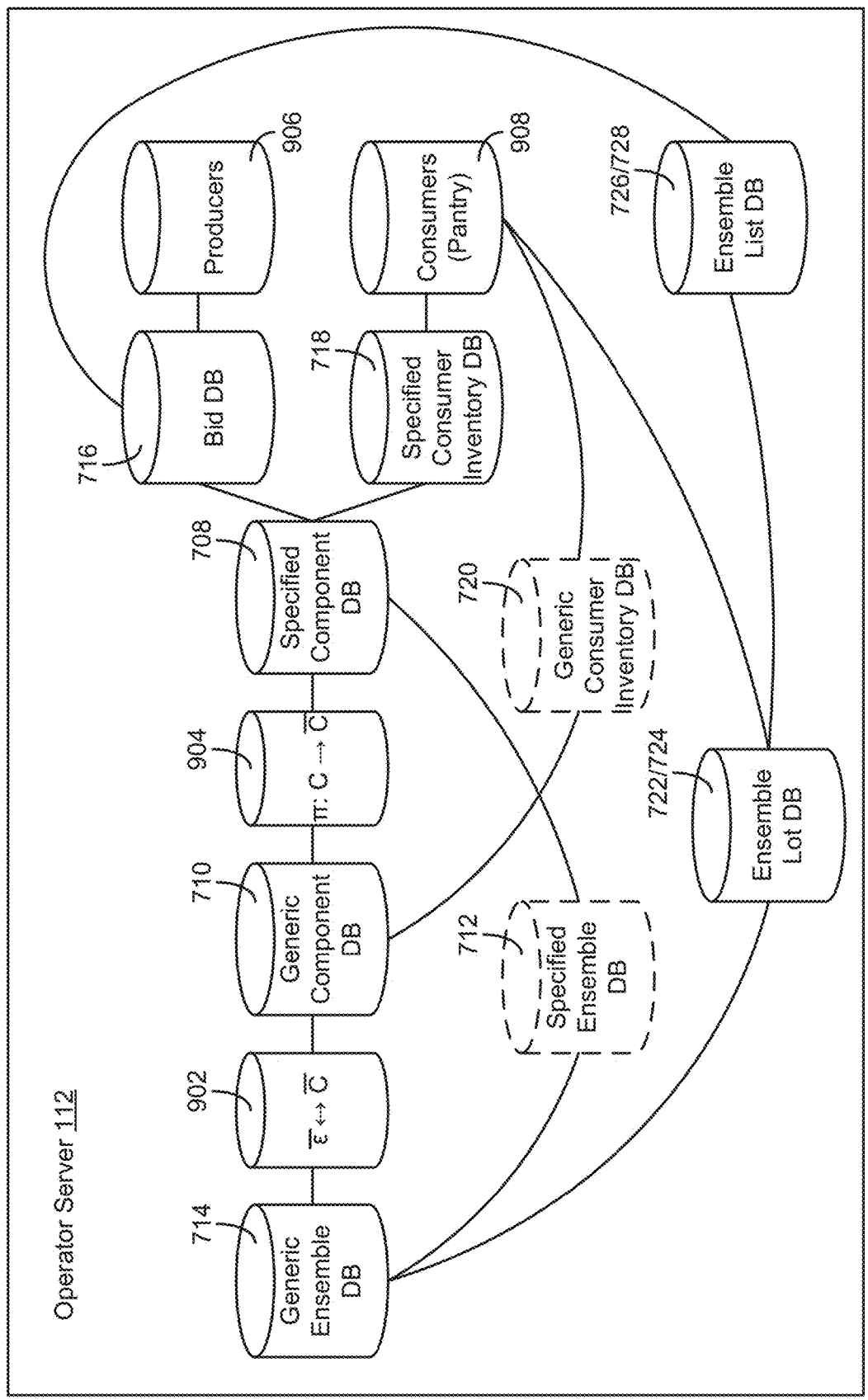
FIG. 9 is a block diagram illustrating database relationships between the various databases and modules of the operator server, according to an exemplary embodiment.

Referring now to FIG. 9, another block diagram of operator server 112 is shown. In the illustration of FIG. 9, exemplary relationships between the various databases (or data stores) of operator server 112 are shown in greater detail. The various databases may be maintained by one or more modules (e.g., a database management system with administration modules) of operator server 112.

Operator server 112 includes generic ensemble database 714 configured to store generic ensembles. The generic ensembles stored by database 714 may be managed by, for example, generic ensemble module 734.

Operator server 112 further includes generic component database 710 configured to store generic component information. The generic component information may be managed by, for example, generic component module 732. The relationship between generic ensembles $\bar{e}$ and generic components $\bar{c}$ may further be stored in a database 902. For example, database 902 may store a relationship between the data in databases 710, 714 that describes which components are in a particular ensemble. For example, if generic ensemble database 714 stores recipes, database 902 may store a relationship between a particular recipe and ingredients in the recipe. One or more of modules 732, 734 may be configured to maintain database 902. While the relationships between databases 710, 714 are shown in FIG. 9 as being stored in database (e.g., table) 902, it should be noted that the relationships may be represented by other information structures such as by relational fields within one or both of generic ensemble database 714 and generic component database 710.

Operator server 112 includes specified component database 708 configured to store specified components. The specified components stored by database 708 may be managed by, for example, specified component module 730. The relationship between generic components $\bar{c}$ and specified components c (e.g., the function π) may be stored in a database 904. For example, database 902 may store a relationship between the data in databases 708, 710 that describes which generic component a specified component should be related to by operator server 112. For example, if the specified components are ingredients or other types of branded products, database 904 may store a relation between the branded product (e.g., BrandA cheddar cheese) and its associated generic component (e.g., cheddar cheese).

Specified component database 708 is shown coupled to bid database 716 and specified consumer inventory database 718. Databases 716, 718 may include information relating to particular specified components. Operator server 112 may be configured to make sure all specified components of the data entries in databases 716, 718 are defined by or matched to specified component database 708.

Generic ensemble database 714 may be connected to specified component database 708 via a specified ensemble database 712. Specified ensemble database 712 may be a database created by generic ensemble module 734 or another module. Specified ensemble database 712 may store a relation between the generic ensembles and the specified components. In one embodiment, specified ensemble database 712 may not be included in operator server 112. Instead, specified ensemble database 712 may be a "virtual" database in that it does not physically exist in operator server 712, but the relationships that would be stored by database 712 are determined programmatically.

Generic component database 710 may be connected to a consumer database 908 via a generic consumer inventory database 720. Generic consumer inventory database 720 may be a database created by inventory generalization module 740 or another module. Generic consumer inventory database 720 may use specified consumer inventory DB 718 to record a relationship between generic component database 710 and consumer database 908. In one embodiment, generic consumer inventory database 720 may not be included in operator server 112. Instead, specified consumer inventory database 718 may store consumer inventory information, and the relations stored in database 904 (relations between specified components and generic components) may be used to generalize the components in 718 without the need for a separate database such as database 720.

Operator server 112 is shown to include a producer database 906 and consumer database 908. Producer database 906 may store producer information provided by the producer, and operator server 112 may be configured to use the information to store bid information in bid database 716. Consumer database 908 may store consumer information, and operator server 112 may be configured to use the information to store consumer inventory information in specified consumer inventory database 718 and to determine search criteria provided by the consumer. Databases 906, 908 may be databases of information managed by any module of operator server 112 (e.g., producer bid module 736, consumer inventory module 738, auction initiation module 742, etc.).

Operator server 112 includes an ensemble lot database (e.g., such as a generic ensemble lot database 722 and specified ensemble lot database 724). Database 722/724 may be connected to generic ensemble database 714 and may store an unordered subset of the generic ensembles in database 714. This unordered subset may be a set of relationships between the generic ensembles and inventories. For example, in the recipe example, the unordered subset of entries in database 722/724 may include relations between recipes and the consumer's ingredients. Operator server 112, and more particularly generic ensemble lot module 744 and specified ensemble lot module 744, may use one or more of search criteria in database 908, inventory information in database 718, or other information to select the unordered subset of generic ensembles.

Operator server 112 includes an ensemble list database (e.g., such as specified ensemble list database 726 and generic ensemble list database 728). Database 726/728 may be derived from database 722/724 and to bid database 716. Database 726/728 may store an ordered subset of generic ensembles that are stored in database 722/724. For example, in the recipe example, the ordered subset of entries in database 726/728 may include relations between recipes and the consumer's ingredients, ordered based on the information in bid database 716. Operator server 112, and more particularly specified ensemble list module 748 and generic ensemble list module 750, may use information in bid database 716 to order the subset of generic ensembles.

As an example of the relations between the databases of operator server 112, assume that producers provide bids for branded ingredients and consumers provide inventory information (such as owned ingredients) to operator server 112. Producer information is stored in database 906 and consumer information is stored in database 908, and then bids on the branded ingredients are stored in bid database 716 and the owned ingredients are stored in specified consumer inventory database 718. Operator server 112 may use the relations stored in database 904 to identify a generic version of the ingredient for each owned ingredient. Database 904 may be formed as an initial step of operator server 112 by using information in databases 708, 710.

When operator server 112 receives a recipe search request, recipes in generic ensemble database 714 may be retrieved. The recipes may be selected based on ingredient information stored in database 902 (e.g., checking if the consumer can make the recipe given his or her owned ingredients) and on other consumer information. Ensemble lot database 722/724 may store the unordered list of recipes retrieved. The list may then be ordered based on the producer bids and stored in database 726/728.

In some embodiments, the computerized auction system described above may be referred to as implementing a SMART Campaign, or a "Synthesized Marketing using Anonymous Retail Tactics" Campaign. Where a traditional marketing campaign may be characterized as a marketer's allocation of a budget toward to promote the consumption of a product, a SMART Campaign (e.g., as implemented by the systems or methods of this disclosure) may advantageously be considered to be a combination of such marketing campaigns, from several marketers, such that the products being promoted are components of an ensemble, and resulting in a single combined budget (e.g., spanning multiple components, spanning multiple marketers per component) to promote the consumption of the ensemble. The entity performing synthesis of marketing campaigns into a SMART Campaign may be embodied in a server computer that collects data about each marketing campaign from the marketers and performs an analysis to combine the data from these campaigns. Anonymity may be built into this process, as described above, in that the marketers have no direct knowledge of which other marketers' campaigns are combined with their own.

For example, if Marketer A is running a marketing campaign with a budget of $0.03 per ounce to promote the consumption of BrandA cheddar cheese, and Marketer B is running a marketing campaign with a budget of $0.02 per slice to promote the consumption of BrandB wheat bread, then these two marketing campaigns may be combined into a single campaign (i.e. a SMART Campaign) to promote the consumption of cheese sandwiches. Assuming a cheese sandwich consists of two slices of wheat bread and 1 ounce of cheddar cheese, the budget of this SMART Campaign is $0.07 per cheese sandwich. Given that the two marketing campaigns are received and combined by an independent operator, Marketer A has no direct knowledge that the campaign of Marketer B is being combined with Marker A's campaign to form the resulting SMART Campaign. In practice, the SMART Campaign operator would then use this budget to promote the consumption of cheese sandwiches to consumers in the possession of BrandA cheddar cheese and BrandB wheat bread, thereby indirectly promoting the consumption of these two products.

In other embodiments, a SMART Campaign may consist of the synthesis of marketing campaigns across several ensembles, ranking the ensembles from highest budget to least, and then presenting a portion of this list of ensembles to a consumer. For example, Marketer A might also run a marketing campaign with a budget of $0.01 to promote the consumption of 1 BrandC tomato. The SMART Campaign on a cheese and tomato sandwich, using these three brands of food ingredients, would have a higher combined budget that the cheese sandwich. Assuming a consumer is in possession of all three brands of food and wishes to eat a sandwich, then the operating software would present to the consumer a cheese and tomato sandwich, followed by a cheese sandwich.

In other embodiments, in addition to the features above, an exemplary SMART Campaign server may: have access to a set of ensembles with the brands of the components not specified; may allow consumers to enter their inventory of branded items; can then determine which ensembles the consumer can make using components from his or her inventory; may display the ranked list of ensembles that match the consumer's search criteria; may then record which of the displayed ensembles are selected by the consumer; and finally may invoice those marketers whose individual campaign budgets contributed to the combined budgets of the selected ensembles. In such an embodiment, a SMART Campaign spans several steps, beginning with the synthesis of individual marketing campaigns, and culminating with extracting payment from the marketers who ran those campaigns.

According to the exemplary embodiment shown in FIG. 10, an alternative representation of the user interface 400 of FIG. 4 is shown as user interface 1000. The user interface 1000 may include a "my pantry" section 1002 that allows the consumer to view his or her current inventory while viewing the search results 1004. The "my pantry" section 1002 may also allow the consumer to edit his or her current inventory by selecting the "edit pantry" link/button. By selecting the "edit pantry" link/button, the consumer may be returned to the user interface 200 of FIG. 2 and/or be able to edit the current inventory directly in the "my pantry" section 1002.

The user interface 1000 is configured to display sets of generic ensemble search results that relate to the current inventory within the "my pantry" section 1002 and/or based on search keywords entered by the consumer using the user interface 300 of FIG. 3. Using the user interface 1000, the operator server 112 may cause the search results 1004 to be displayed to the consumer in ordered sets, represented by sets 1010, 1020, 1030, and 1040. For example, the set 1010 represents a set (e.g., a group, a plurality, etc.) of generic ensembles that may fit under the category of "Applesauce Cake", while the set 1020 represents a set of generic ensembles that may fit under the category of "Cinnamon rolls". As shown in FIG. 10, each of the sets 1010, 1020, 1030, and 1040 include a relevance percentage (e.g., a "Pantrywiser %", etc.), shown as relevance percentages 1012, 1022, 1032, and 1042, respectively. The relevance percentages 1012, 1022, 1032, and 1042 represent how the generic ensembles (i.e., recipes, etc.) within the respective set relate to the current inventory (e.g., ingredients, etc.) within the "my pantry" section 1002. The relevance percentage is reflective of an amount of an ensemble (e.g., recipe, etc.) held in the inventory of the consumer. For example, the set 1010 includes a relevance percentage 1012 of 100%, while the set 1020 includes a relevance percentage 1022 of 54%. Therefore, the generic ensembles within the set 1010 fit within the basic search criteria and are 100% relevant to the current search and/or current inventory (i.e., the current inventory includes all the items or ingredients needed to make the generic ensemble or recipe, etc.), while the consumer only has 54% of the inventory needed to make the generic ensembles within the set 1020. In some embodiments, the relevance percentage takes into account search criteria provided by the consumer in addition to inventory fit.

In one embodiment, the operator server 112 may sort the sets in order of relevance percentage such that an ensemble or a set of ensembles (e.g., the set 1010, etc.) with a higher relevance percentage is displayed first. One or more of the remaining sets may be displayed in descending order based on the respective relevance percentage. The operator server 112 may use the information provided by the consumer (e.g., search criteria, current inventory, etc.) to select generic ensembles (e.g., recipes, etc.) that fit within one set. The generic ensembles within the individual sets are displayed in descending order based on the total worth (i.e., the cumulative bids provided by the highest bidding producers for each component of an ensemble, etc.) of each generic ensemble. For example, the total bids on each specified component of a generic ensemble from the producers are summed, giving the total worth of the generic ensemble. This summation may be done for each generic ensemble within the set. Then the generic ensembles are ranked such that the generic ensemble with the highest worth within the individual set is displayed first, and the generic ensemble with the lowest worth is displayed last. This ranking may be done for each of the sets presented to the consumer. In some embodiments, the highest worth generic ensemble in a first set may be less than the highest worth generic ensemble in a second set. For example, the first displayed generic ensemble in set 1010 may be worth $1.00, while the first displayed generic ensemble in set 1020 may be worth $1.50. Therefore, the search results 1004 displayed by the operator server 112 may favor the relevance of the generic ensemble to the search criteria and/or current inventory provided by the consumer over the worth of the generic ensemble.

Still referring to FIG. 10, the consumer may select one of the sets within the search results 1004 and be provided a user interface similar to user interface 400 of FIG. 4, including generic ensembles that are categorized under the respective set and ordered by worth, as described above. By way of example, in a recipe embodiment, the list of generic ensembles may include a name of each recipe and the number of servings the recipe is designed to create. Search results 402 may further include a description of the recipe, a list of ingredients needed to make the recipe, and/or the instructions to make the recipe. In some embodiments, as shown in FIG. 10, the top ranked generic ensemble in the first set (e.g., the set 1010, etc.) may be displayed within the search results 1004 of the user interface 1000, represented by top ranked generic ensemble 1014. By displaying the top ranked ensemble (e.g., first by relevance, then by worth; etc.) directly on the search results 1004 of the user interface 1000, producers may be incentivized to increase their bids such that their component/ingredient is featured within the top ranked generic ensemble 1014 and potentially used/consumed more frequently by consumers.

In some embodiments, a consumer may choose to see more details on an individual generic ensemble. To do so, in one embodiment, the consumer may select a desired set, displaying a user interface similar to the user interface 400 of FIG. 4, where each ensemble within the selected set includes an identical relevance percentage. The ensembles within the selected set are displayed in a ranked order based on the cumulative bids for each respective ensemble (e.g., with the ensemble with the highest cumulative bid displayed at the top of the list of ensembles, etc.). Next, the consumer may select a desired generic ensemble from the list of ranked generic ensembles on the user interface 400, displaying a user interface similar to the user interface 500 of FIG. 5. In another embodiment, the ensembles within the selected set are displayed in a ranked order based on the cumulative bids for each respective ensemble and displayed on the user interface 1000. A shown in FIG. 10, each of the sets 1010-1040 includes a "box". By way of example, the list of ranked ensembles with the same relevance percentage may be displayed in the "box" of a respective set. In one embodiments, the display of the ranked ensembles may be a preview or representation of the top few ranked ensembles (e.g., the top 3, 4, 5, etc.). In another embodiments, the "box" may include a scrollable feature such that the entire list of ranked ensemble may be viewed directly from the user interface 1000. Again, a consumer may select one of the ranked ensembles to see more detail on the desired ensemble.

Once a desired ensemble is selected, the user may see a more detailed description of the selected generic ensemble such as a detailed list of components (e.g., ingredients, etc.) and directions (e.g., preparation instructions, cooking instructions, etc.), as described above in regard to FIG. 5. As described above, the consumer may select the recipe for consumption using button 506, or directly on the search results 1004 using consume button 1016 or schedule to eat button 1018 regarding the top ranked generic ensemble 1014. In some embodiments, further subsequent user action is required. The subsequent user action that may be used could be, for example, a confirmation that the recipe was made, a calculation of particular component amounts based on serving size, use of the components associated with the ensemble, entry of a review of the recipe, or another user action which indicates that the recipe was used. Once the system receives an indication that the user consumed a recipe, then an automated module may appropriately reduce or remove the proper components from the consumer's inventory. Such a reduction or removal may trigger a reminder or other notice to be provided to the consumer to restock the consumer's inventory. Also, the producer payment module 752 may provide an invoice to the producers who bid on the respective components in the consumed ensemble (e.g., cooked recipe, etc.).

Figure 11:
FIG. 11 is an illustration of a user interface of the computerized auction system illustrating a producer bidding interface, according to an alternative embodiment.

Referring now to FIG. 11, an alternative user interface to the user interface 600 of FIG. 6 is shown. In FIG. 11, an illustration of a user interface 1100 is shown, according to an exemplary embodiment. The user interface 1100 is configured to allow a producer to submit and/or edit bidding parameter of a bidding campaign on a desired component or components (e.g., a brand component, a generic component, a complementary component, etc.). The user interface 1100 may generally allow a producer to submit bids on various specified components to build a campaign strategy for each component being bid on.

The producer (labeled "BrandA" in FIG. 11) may enter bids in user interface 1100 in bidding section 1102. As shown in FIG. 11, the producers may bid on specific components (e.g., BrandA vanilla extract, BrandA Cinnamon, etc.) and/or generic components (e.g., vanilla extract, all-purpose flour, sugar, etc.). The generic components may be generic versions of the producer's specific components (e.g., BrandA vanilla extract vs. generic vanilla extract, etc.). The generic components may also be complementary generic components that promote the consumption of recipes that include the producer's specific components (e.g., BrandA's vanilla extract or cinnamon may often be used with sugar, flour, etc.).

For a given product name 1104, the producer may enter a target bid 1106 and an end bid 1110 for a given unit of measure 1108 and quantity 1112 of the specified component (ingredient in the example of FIG. 11). The unit of measure 1108 may be selected by the producer to be in one of volume (e.g., fluid ounces (fl oz), gallon, (gal), milliliters (ml), cups, etc.), weight (e.g., ounces (oz), pounds (lb), grams (g), etc.), or count (e.g., 1 banana, 1 egg, etc.). The unit of measure 1108 allows the producer to create a campaign for a component using a measurement most familiar with the producer for the component(s) being promoted. For example, a producer of 5 gallon water jugs may be familiar with measurements in gallons, while a producer of vanilla extract may be familiar with measurements in fluid ounces. In either case, the computerized auction system 100 reduces each of the unit of measurements to a lowest common unit for each of the three categories (e.g., weight, volume, count, etc.), such that units of the measurement within the same category are generalized. For example, in the volume category, 1 fl oz is equivalent to 519.74 drops and 1 cup is equivalent to 4157.92 drops (e.g., 1 cup equals 8 fl oz, etc.). In another example, in the weight category, units of measure for weights may be broken down into 1/100 of an ounce. In yet another example, in the count category, units of measure for counts may be broken down into 1/100 of a count. This allows the computerized auction system 100 to compensate for fractional components in ensembles (e.g., 2.5 fl oz, half a banana, etc.) selected by the consumer such that the producer is debited for exactly what was consumed.

The target bid 1106 may be a mean bid (e.g., average bid, etc.) that indicates what a producer wants to spend per unit of measure 1108 over a campaign for a specific component (e.g., vanilla extract, etc.). In essence, the higher the target bid 1106, the greater the overall budget of the campaign will be, and vice versa. In some embodiments, a producer may be able to input a desired budget for the campaign instead of the target bid 1106. Therefore, the unit of measure 1108, the quantity 1112, and the desired budget may be used to determine the target bid 1106. By way of example, a producer may be able to provide at least two of the target bid 1106, the unit of measure 1108, the quantity 1112, and the desired budget and the computerized auction system 100 is able to determine the non-provided information. The end bid 1110 is a final bid (e.g., last bid, etc.) that indicates what a producer wants to spend on the last unit of measure 1108 in the campaign. The function and purpose of the target bid 1106 and the end bid 1110 is described more fully herein.

Figure 12:
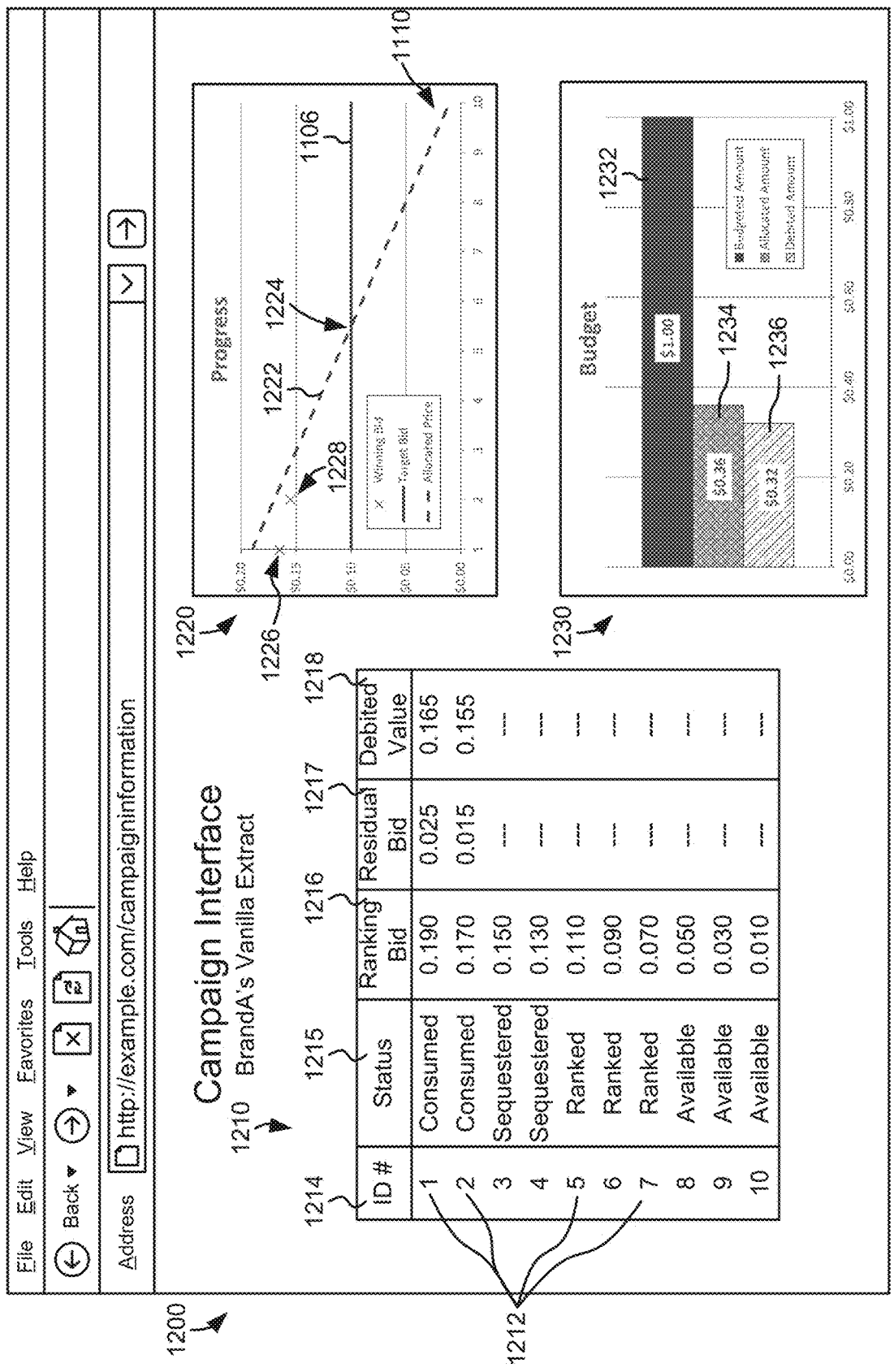
FIG. 12 is an illustration of a user interface of the computerized auction system illustrating a campaign interface, according to an exemplary embodiment.

According to the exemplary embodiment shown in FIG. 12, a user interface 1200 provides a campaign interface to a producer with information regarding an individual campaign for a component. The information presented to the producer on user interface 1200 is based on the selections (e.g., bidding parameters, etc.) made by the producer on the user interface 1100 (e.g., target bid 1106, unit of measure 1108, end bid 1110, quantity 1112, etc.). As shown in FIG. 12, the user interface 1200 displays campaign information to a producer regarding BrandA's Vanilla extract. Therefore, the campaign shown in FIG. 12 is based on the target bid 1106 of $0.10 per ounce for a quantity 1112 of 10 ounces with the end bid 1110 of $0.01 chosen by the producer on the user interface 1100. The above campaign is exemplary and for illustrative purposes. In other embodiments, the campaigns may include various different bidding values and/or quantities.

As shown in FIG. 12, the user interface 1200 provides a campaign table 1210, a campaign progress graph 1220, and a budget graph 1230. In other embodiments, the user interface 1200 may include more information regarding a campaign. The campaign table 1210, the campaign progress graph 1220, and the budget graph 1230 are generated based on the selections made by the producer on the user interface 1100 (e.g., target bid 1106, unit of measure 1108, end bid 1110, quantity 1112, etc.). The campaign table 1210 breaks the quantity 1112 into slots 1212 based on the unit of measure 1108. The computerized auction system 100, however, breaks the slots 1112 down further into micro-slots based on the lowest common unit, as described above, which may not be presented to the producers on the user interface 1200. By doing so, fractional amounts of a unit of measure 1108 may be accounted for. Each of the slots 1212 includes an identification number 1214, a status identifier 1215, a ranking bid 1216, a residual bid 1217, and a debited value 1218. The identification numbers 1214 identify which unit of measure 1108 is located within the individual slot 1212. For example, an identification number 1214 of one represents the first ounce of vanilla extract bid on by the producer in the campaign, an identification number 1214 of five represents the fifth ounce of vanilla extract bid on by the producer in the campaign, and so on for each unit of measure 1108 within the campaign based on the quantity 1112. For example, the campaign table 1210 includes ten slots 1212, one for each of the ten ounces of vanilla extract in the example campaign.

The status identifier 1215 indicates the status of a particular slot 1212. The status of the slots 1212 may be one of available, ranked, sequestered, and consumed. An available status indicates that the respective slot 1212 is available to be allocated to a specific session of one consumer. A ranked status indicates that the respective slot 1212 has been allocated to a specific session of one consumer such that the slot 1212 is not available to be allocated to other sessions of the same consumer or other consumers. If a generic ensemble including the ranked slot 1212 is not selected by the consumer, the respective slot 1212 returns to an available status. If the generic ensemble including the ranked slot 1212 is selected by the consumer, the ranked slot 1212 becomes sequestered. A sequestered status indicates that a consumer has selected a generic ensemble that includes the respective slot 1212, but has not yet consumed the respective slot 1212. For example, a consumer may select a recipe including a specific component (e.g., vanilla extract, etc.) for which he/she plans to cook in the future (e.g., by indicating a future cook date by putting in a calendar of the computerized auction system 100, using the schedule to eat button 1018, etc.). The consumer may choose to remove the generic ensemble, such that the sequestered slot 1212 returns to an available status. Conversely, the consumer may indicate that he or she has consumed the generic ensemble including the sequestered slot 1212 (e.g., using the button 1016, the button 506, etc.) such that the status of the respective slot 1212 becomes consumed. A consumed status indicates that the respective slot 1212 has been consumed by a consumer and that the producer has been debited the value of the ranking bid 1216. In some embodiments, the producer is debited an amount less than the ranking bid 1216, as shown in campaign table 1210 for slot 1 and slot 2. The ranking bid 1216, target bid 1106, and the end bid 1110 and how each affects a producer's campaign is described in additional detail below.

Referring now to FIGS. 11-12, the exemplary embodiment shown includes a campaign for a producer of BrandA vanilla extract where the target bid 1106 is $0.10 per ounce for a quantity 1112 of 10 ounces. As shown in the budget graph 1230, the chosen target bid 1106 and quantity 1112 makes a budgeted amount 1232 of $1.00 for the example campaign (e.g., 10 ounces at an average bid of $0.10, etc.). In some embodiments, the budgeted amount 1232 is completely consumed over the life of the campaign. In other embodiments, a portion of the budgeted amount 1232 is consumed over the life of a campaign (e.g., 98%, 90%, 85%, etc.). However, the budgeted amount 1232 may not be exceeded over the life of the campaign.

As mentioned above, a producer has the ability to take different campaign strategies. The strategy chosen is based on the selection of the end bid 1110. The target bid 1106 and the end bid 1110 define the strategy, as shown in progress graph 1220. As described above, the target bid 1106 is an average bid (i.e., constant amount, etc.) over the duration on the campaign (e.g., ten ounces, ten slots 1212, etc.). The end bid 1106 is the price the producer wants to pay for the final slot (e.g., slot 10, etc.) of the campaign. The end bid 1110 may be selected to be greater than, less than, or equal to the target bid 1106. The target bid 1106 and the end bid 1110 define a line, shown as allocated price 1222. The allocated price 1222 is defined by the end bid 1110 and a midpoint 1224 of the target bid 1106 over the campaign (e.g., the midpoint between slot 1 and slot 10 is 5.5, etc.). The allocated price 1222 indicates the value of the ranking bids 1216 for each of the slots 1212. The ranking bids 1216 vary based on the strategy. The allocated price 1222 may be determined using the following expressions:

$$AP(S_x) = m(S_x - S_n) + EB_v$$

$$m = \frac{TB_v - EP_v}{TB_{mp} - S_n}$$

$$TB_{mp} = \frac{S_n + S_1}{2}$$

where AP is the allocated price 1222, m is the slope of the allocated price, $S_x$ is the identification number 1214 of the slot 1212 for the ranking bid 1216 being calculated, $S_n$ is the identification number 1214 of the last slot 1212 in the campaign, $S_1$ is the identification number 1214 of the first slot 1212 in the campaign (i.e., a value of 1, etc.), $EB_v$ is the value of the end bid 1110, $TB_v$ is the value of the target bid 1106, and $TB_{mp}$ is the midpoint 1224 of the target bid 1106 for the campaign. Therefore, the allocated price 1222 allows for the ranking bids 1216 to be determined based on the respective slots 1212 to which each belongs.

The strategies may include an early aggressiveness strategy, a late aggressiveness strategy, or a constant strategy. In the exemplary embodiment shown in FIGS. 11-12, the example campaign is using an early aggressiveness strategy such that the ranking bids 1216 for earlier slots 1212 have a higher value than later slots 1212 (e.g., in a descending order, the allocated price 1222 has a negative slope, etc.). In another embodiment, a campaign uses a late aggressiveness strategy such that the ranking bids 1216 for earlier slots 1212 have a lower value than later slots 1212 (e.g., in an ascending order, the allocated price 1222 has a positive slope, etc.). In yet another embodiment, a campaign uses a constant strategy such that the ranking bids 1216 are constant (e.g., equal to the target bid 1106 and the end bid 1110, the allocated price 1222 has a slope of zero, etc.). In some embodiments, a producer has the ability to change the strategy mid-campaign. For example, a producer may increase or decrease at least one of the target bid 1106, the unit of measure 1108, the end bid 1110, the quantity 1112, and the budget of a running campaign. By changing one or more of the aforementioned bidding parameters, the computerized auction system 100 may automatically update the strategy of the campaign based on the changed bidding parameters.

According to an exemplary embodiment, the slots 1212 of all producer campaigns for a component are compared when the generic ensembles are filtered by the computerized auction system 100 for a consumers search session. The slots 1212 with the highest ranking bid 1216 are sequestered when a generic ensemble including a component associated with the slot 1212 is selected (e.g., consumed, scheduled, etc.). In one embodiment, the computerized auction system 100 uses a generalized second-price auction. Therefore, the producer with the highest ranking bid 1216 for the consumed slot 1212 is debited the amount of the second highest ranking bid 1216 during the consumer session, if one exists. For example, if a recipe that has been selected for consumption by a consumer requires one fluid ounce of vanilla extract, the producer with an active campaign for vanilla extract with the highest ranking bids 1216 for an ounce of vanilla extract is debited. However, the debited amount may be less than or equal to the ranking bid 1216.

According to an exemplary embodiment, the residual bid 1217 is determined based on a proportional difference of the cumulative bid total for a winning ensemble and its reference ensemble (e.g., next ranked recipe, etc.). The cumulative bid total is the sum of the highest ranking bids 1216 provided by campaigns of producers for each individual component of an ensemble. Then, the value of each ranking bid 1216 of each contributing campaign in a winning ensemble (e.g., of a plurality producers for each component of the ensemble, etc.) is reduced by the proportional difference. The residual bid 1217 may be represented by the following expressions:

$$\delta = \frac{B^{(n)}_{cumulative} - B^{(n+1)}_{cumulative}}{B^{(n)}_{cumulative}}$$

-continued $$B_{residual}^{(S_x)} = \delta \cdot B_{ranking}^{(S_x)}$$

where δ is the proportional difference, $B_{cumulative}^{(n)}$ is the cumulative bid total for a recipe of rank n, $B_{cumulative}^{(n+1)}$ is the cumulative bid total for a recipe of rank n+1, $B_{ranking}^{(S_x)}$ is the ranking bid 1216 for a slot 1212 with an identification number 1214 of x where the ranking bid 1216 for the component is part of a winning recipe, and $B_{residual}^{(S_x)}$ the residual bid 1217 for the slot 1212 with the identification number 1214 of x.

The foregoing example refers to FIG. 12, and more particularly to the slot 1212 with the identification number 1214 of 1 and assumes that the first slot 1212 is a part of a winning ensemble (i.e., selected for consumption by a consumer, etc.) ranked n within its respective set. As shown in FIG. 12, the first slot 1212 has a the ranking bid 1216 of $0.190. If the winning ensemble is the only ensemble in the set or the lowest ranked ensemble in the set, the first slot is debited the amount of the ranking bid 1216 of the first slot (i.e., $0.190, etc.). However, if the winning ensemble is not the only ensemble within the set nor the last ranked ensemble, the residual bid 1217 for the first slot 1212 is reduced based on the proportional difference between the winning ensemble of rank n and the reference ensemble of rank n+1. For example, if the cumulative bid for a winning ensemble (e.g., of rank 5, etc.) is $1.00 and the cumulative bid for the reference ensemble (e.g., of rank 6, etc.) is $0.868, the proportional difference is 0.132 or 13.2%. Therefore, the residual bid 1217 for the first slot 1212 is $0.025. The debited value 1218 is then determined from the difference between the ranking bid 1216 and the residual bid 1217 of the respective slot. Therefore, the debited value 1218 or winning bid 1226 for the first slot 1212 is $0.165.

In an alternative embodiment, the residual bid 1217 is determined based on the second highest ranking bid 1216 for an individual component. By way of example, when an ensemble is chosen by a consumer for consumption, the ranking bids of the producers with like (e.g., the same, etc.) components included in an ensemble are compared. The top two ranking bids 1216 for the same component are compared and the difference between the two is the residual bid 1217. For example, if the highest ranking bid 1216 is $0.190 and the second highest ranking bid is $0.165, the producer of the highest ranking bid 1216 is debited the amount of the second highest ranking bid, the winning bid 1226 of $0.165. The residual bid 1217 is determined based on the difference between the ranking bid 1216 and the winning bid 1226 for a respective slot 1212. For example, the difference between the ranking bid 1216 and the winning bid 1226 of slot 1 is $0.025. Therefore, the residual bid 1217 is $0.025.

The residual bid 1217 indicates the amount of money the producer saved on a slot 1212 in comparison to what they would have paid (e.g., the ranking bid 1216, etc.) if a residual bid 1217 was unavailable to be allocated. For example, referring to budget graph 1230, this is shown by allocated amount 1234 and debited amount 1236. The producer of the example campaign has two slots 1212 which have been consumed with the two ranking bids 1216 totaling an allocated amount 1234 of $0.36. However, due to the generalized second-place auction, the producer was charged a debited amount 1236 of $0.32. In one embodiment, the residual bids 1217 are applied to the next slot(s) 1212 with the status identifier 1215 of "available", thereby increasing the ranking bid 1216 of the next available slot(s) 1212. By way of example, the residual bids 1217 of consumed slots 1 and 2 may be applied to available slot 8, increasing the ranking bid 1216 from $0.050 to $0.090. By way of another example, only one residual bid 1216 may be applied per available slot 1212. For example, available slot 8 may be increased by the residual bid 1217 of the consumed slot 1 from $0.50 to $0.075 and available slot 9 may be increased by the residual bid 1217 of the consumed slot 2 from $0.030 to $0.045.

Figure 13:
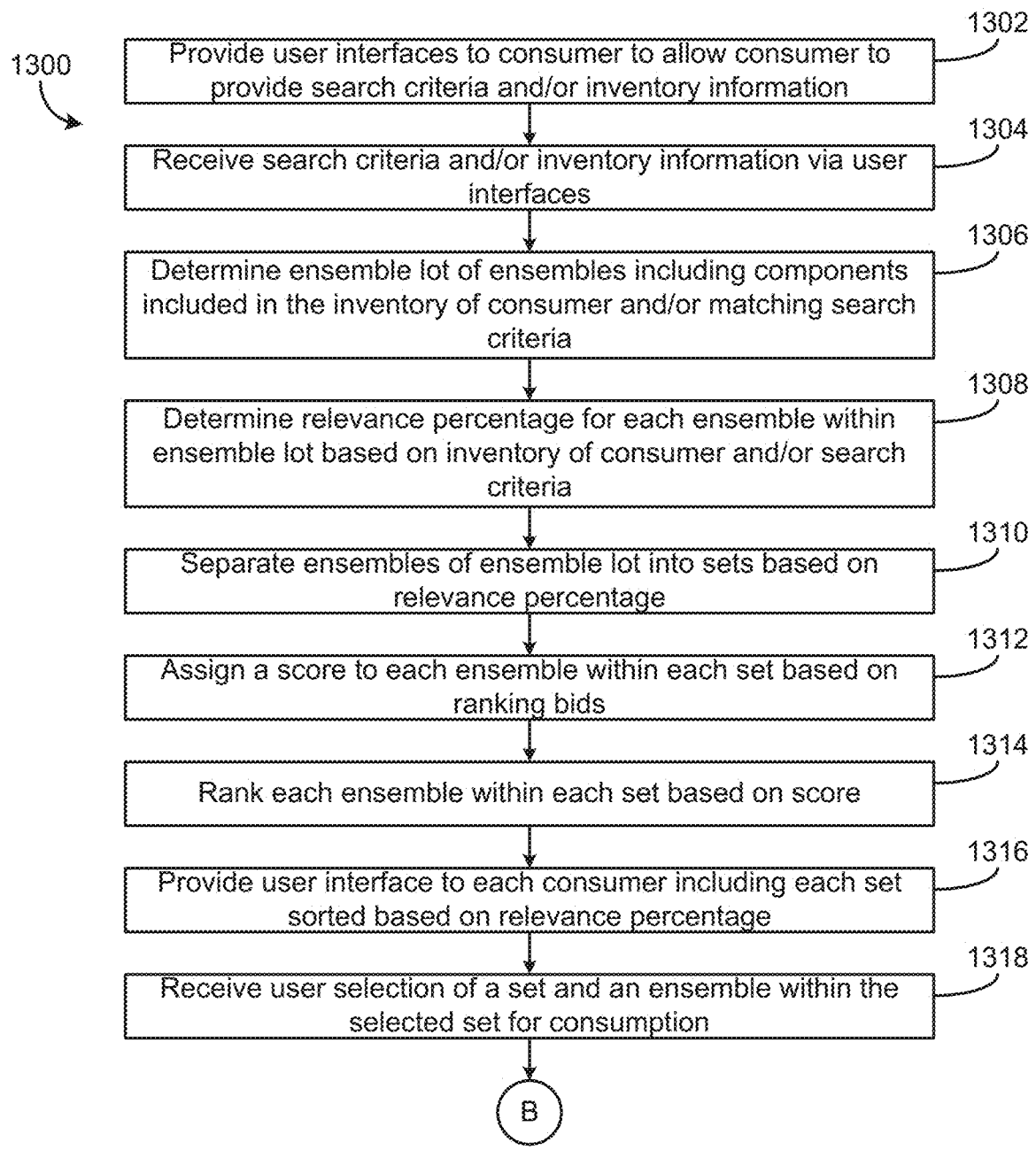
FIG. 13 is a flow diagram of a method for providing sets of ensembles to a consumer of the computerized auction system 100 for consumption, according to an exemplary embodiment.

Referring now to FIG. 13, a method 1300 for providing sets of ensembles to a consumer of the computerized auction system 100 for consumption is shown, according to an exemplary embodiment. Method 1300 may be executed by, for example, the modules of operator server 112 as described above.

At step 1302, the computerized auction system 100 provides a consumer with a user interfaces (e.g., the user interface 200, an inventory interface, the user interface 300, a search interface, etc.) to allow the consumer to provide search criteria and/or inventory information (e.g., ingredients in the possession of the consumer, etc.). At step 1304, the computerized auction system 100 receives the search criteria and/or inventory information from the consumer via the user interfaces. By way of example, a consumer may provide search criteria pertaining to a type of cuisine (e.g., Italian, German, Polish, Mexican, etc.), a type of dish (e.g., pasta, soups, salads, steak, etc.), and/or a type of a meal (e.g., breakfast, lunch, dinner, brunch, dessert, etc.), among other possibilities. By way of another example, a consumer may provide inventory information including ingredients he/she possesses and the quantity of each ingredient. The consumer may also provide information regarding the brand each ingredient.

At step 1306, the computerized auction system 100 determines an ensemble lot of ensembles (i.e., an unordered list of ensembles, etc.) that include components (e.g., ingredients, etc.) in the inventory of the consumer and/or match the search criteria. The ensembles may include both specific/brand components and generic components. At step 1308, the computerized auction system 100 determines a relevance percentage for each ensemble within the ensemble lot based on the inventory of the consumer and/or the search criteria. As described above, the relevance percentage indicates the degree that the ensembles (e.g., recipes, etc.) relate to the current inventory of the consumer and/or the search criteria provided by the consumer. At step 1310, the computerized auction system 100 separates the ensembles within the ensemble lot into sets based on the relevance percentage. For example, ensembles that are 100% relevant are grouped in a first set, ensembles that are 90% relevant are grouped in a second set, and so on.

At step 1312, the computerized auction system 100 assigns a score (or value) to each ensemble within each set based on ranking bids provided by producers for components within each ensemble. For example, the computerized auction system 100 generates a plurality of bids from a plurality of producers for each of the ingredients within each of the recipes. Each bid specifies an ingredient and bidding parameters defining a ranking bid amount. The computerized auction system 100 then determines the score for each of the plurality of recipes within each of the sets. The score is associated with a highest ranking bid amount total (e.g., greatest value, worth, etc.) for the set ingredients of a recipe based on the ranking bids of the producers (i.e., the score is a sum of the ranking bids from the highest bidding producers on each of the plurality of ingredients of a recipe, etc.). The highest ranking bid amount total for each recipe is determined by summing a highest ranking bid amount (e.g., from the highest bidding producer for an ingredient, etc.) for each of the plurality of ingredients of a recipe scaled by a quantity of each of the plurality of ingredients within the recipe. At step 1314, the computerized auction system 100 ranks each ensemble within each set based on the score. By way example, a first ensemble with a $1.00 value within a first set may be ranked higher than a second ensemble with a $0.90 value within the first set. By way of another example, a first ensemble with a $1.00 value within a first set may be ranked higher than a second ensemble with a $1.10 value within a second set (e.g., because the first ensemble may be more relevant to the consumers search criteria and/or inventory, etc.)

At step 1316, the computerized auction system 100 provides a consumer with a user interface (e.g., the user interface 1000, a results interface, etc.) including each set sorted based on the relevance percentage. For example, the sets are displayed such that the first set has the highest relevance percentage, the second set has the second highest relevance percentage, and so on. Within each set, the ensembles are provided in the ranked order determined in step 1314. At step 1318, the computerized auction system 100 receives a user selection of a set and an ensemble within the selected set for consumption. In other embodiments, the highest ranked ensemble may be selected directly from the user interface, as described above.

Figure 14:
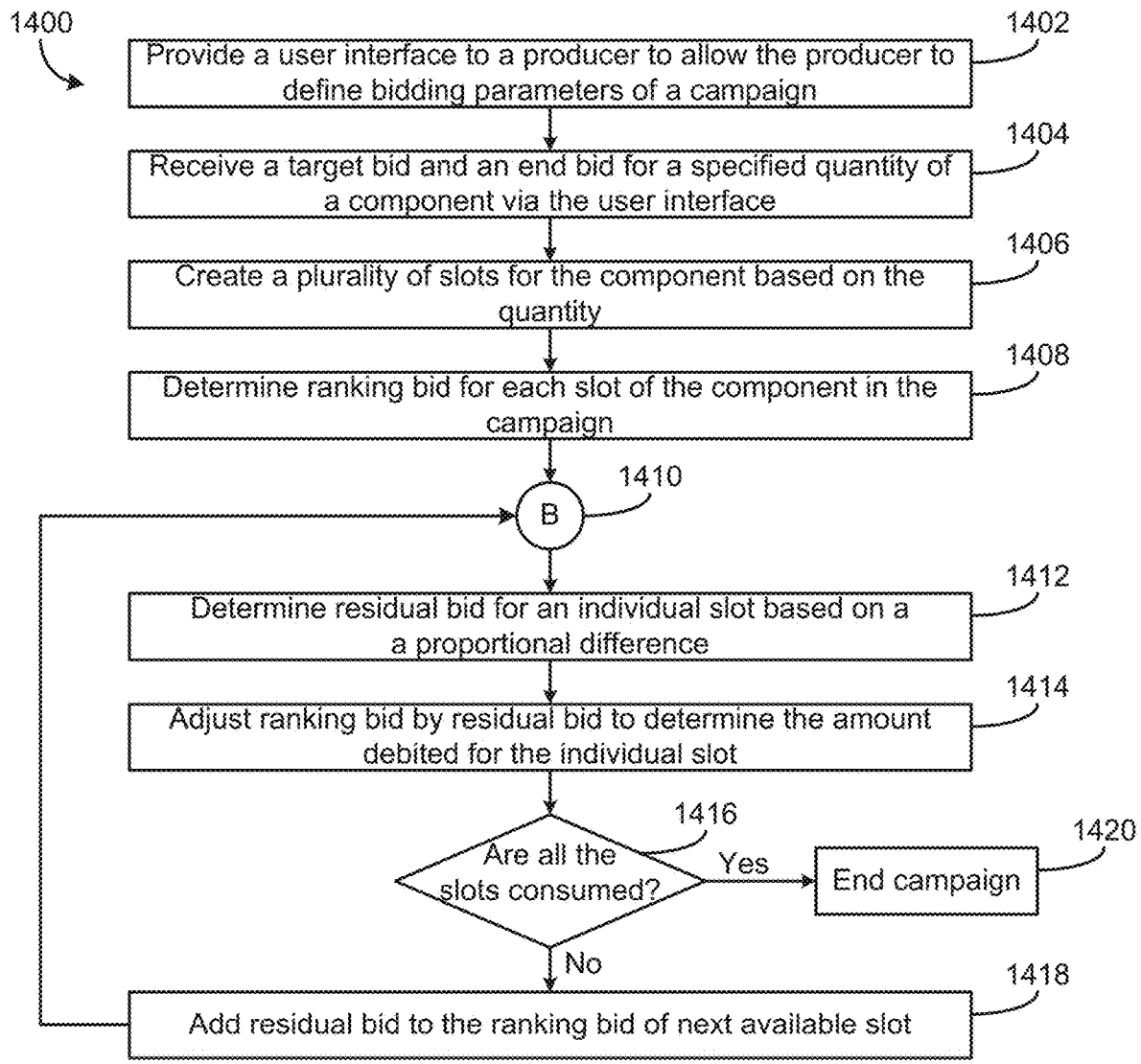
FIG. 14 is a flow diagram of a method for debiting a producer of the computerized auction system 100, according to an exemplary embodiment.

Referring now to FIG. 14, a method 1400 for building a campaign strategy and debiting a producer of the computerized auction system 100 is shown, according to an exemplary embodiment. Method 1400 may be executed by, for example, the modules of operator server 112 as described above.

At step 1402, the computerized auction system 100 provides a user interface (e.g., the user interface 1100, a bidding interface, etc.) to a producer to define bidding parameters of a campaign (e.g., a target bid, an end bid, a quantity, a unit of measurement, etc.). At step 1404, the computerized auction system 100 receives a target bid (e.g., the target bid 1106, etc.) and an end bid (e.g., the end bid 1110, etc.) for a specified quantity (e.g., the quantity 1112, etc.) of a component (e.g., a generic component, a brand component, a complimentary component, etc.) via the user interface from the producer. In some embodiments, the producer further provides a unit of measure (e.g., the unit of measure 1108, etc.) indicating the minimum unit that the bids should be distributed across for the chosen quantity (e.g., 5 pounds converted to 80 ounces, etc.). As described above, the computerized auction system 100 may reduce the unit of measure to a substantially smaller unit to compensate for fractional amounts of a component in an ensemble, but still display results to the producer in the selected unit of measure.

At step 1406, the computerized auction system 100 creates a plurality of slots for the component of the campaign based on the quantity. For example, in a campaign for ten fluid ounces of vanilla extract, ten slots may be created, one for each fluid ounce. In another example, the campaign for ten fluid ounces may be divided by a smaller unit such as a drop, where there are approximately 520 drops in a fluid ounce. Therefore, 5200 slots may be created, one for each drop in the campaign. At step 1408, the computerized auction system 100 determines a ranking bid for each slot of the component in the campaign based on the bidding parameters. As described above, the selection of the target bid and the end bid may vary the strategy (i.e., the slope of the allocated price 1222, etc.) and the ranking bids of the campaign (e.g., early aggressiveness, late aggressiveness, constant, etc.). For example, a negative slope allocates a greater amount of the budget to the ranking bid at a beginning of the campaign than at an end of the campaign, a positive slope allocates a greater amount of the budget to the ranking bid at the end of the campaign than at the beginning of the campaign, and a zero slope allocates the target bid to each of the plurality of slots. At step 1410, the computerized auction system 100 implements method 1300 of FIG. 13, as described above.

At step 1412, the computerized auction system 100 determines a residual bid for an individual slot (or slots) that have been consumed based on a proportional difference. As described above, the residual bid is determined based on a proportional difference of the cumulative bid total for a winning ensemble and its reference ensemble. At step 1414, the computerized auction system 100 adjusts the ranking bid by the residual bid to determine the amount that needs to be debited to the highest bidding producer for the individual slot. For example, the highest bidding producer for a component pays the price of the second highest bidding producer for the same component.

At step 1416, the computerized auction system 100 determines whether all of the slots have been consumed. If all of the slots are not consumed, method 1400 proceeds to step 1418. At step 1418, the computerized auction system 100 adds the residual bid to the ranking bid of the next available slot (i.e., increasing the maximum bid, etc.). As described above, when a first producer (e.g., highest bidder, etc.) bids more than a second producer (e.g., second highest bidder, etc.), the residual bid is applied to the ranking bid of the first producer's next slot with an available status, thereby effectively increasing the ranking bid for the respective available slot. If all of the slots are consumed, the computerized auction system 100 ends the campaign for the component of the producer. By way of example, the campaign may finish under the budgeted amount by the amount of the non-allocated residual bid(s).

Figure 15:
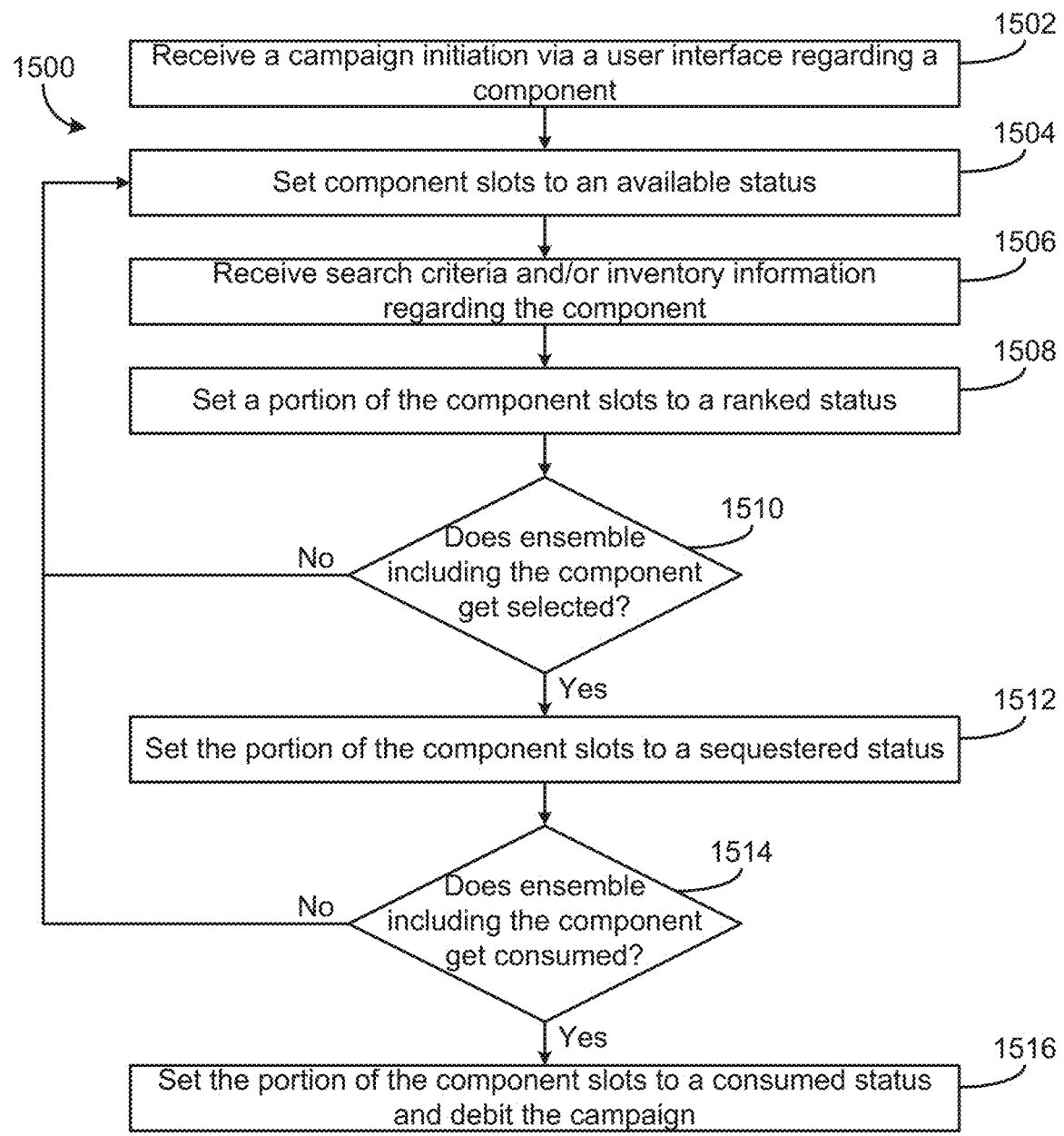
FIG. 15 is a flow diagram of a method for updating the status of slots of a component for a campaign of the computerized auction system 100, according to an exemplary embodiment.

Referring now to FIG. 15, a method 1500 for updating the status of slots of a component for a campaign of the computerized auction system 100 is shown, according to an exemplary embodiment. Method 1500 may be executed by, for example, the modules of operator server 112 as described above.

At step 1502, the computerized auction system 100 receives a campaign initiation via a user interface (e.g., the user interface 1100, etc.) regarding a component (e.g., BrandA vanilla extract, etc.). At step 1504, the computerized auction system 100 sets component slots of the component of the campaign to an available status. The computerized auction system 100 may first create a plurality of slots for the component of the campaign based on a quantity selected by a producer during the campaign initiation. As described above, an available status indicates that a slot is available to be allocated to a specific session of one consumer.

At step 1506, the computerized auction system 100 receives search criteria and/or inventory information regarding the component (e.g., via the user interface 200, the user interface 300, etc.). At step 1508, the computerized auction system 100 sets a portion of the component slots to a ranked status (e.g., based on the quantity of the component in an ensemble, etc.). As described above, a ranked status indicates that a slot has been allocated to a specific session of one consumer such that the slot is not available to be allocated to other sessions of the same consumer or other consumers. At step 1510, the computerized auction system 100 determines whether an ensemble including the component is selected by a consumer (e.g., via the user interface 400, the user interface 1100, etc.). If the ensemble including the component is not selected, the portion of the component slots that were ranked are returned to an available status (step 1504). If the ensemble including the component is selected, the computerized auction system 100 sets the portion of the component slots to a sequestered status. As described above, a sequestered status indicates that a consumer has selected an ensemble that includes the ranked slot(s), but has not yet consumed the respective slots.

At step 1514, the computerized auction system 100 determines whether the ensemble including the components is consumed by the consumer. If the consumer indicates that he or she has consumed the ensemble including the component (e.g., using the button 1016, the button 506, etc.), the computerized auction system 100 sets the portion of the component slots that were sequestered to a consumed status and the campaign (i.e., the producers, etc.) of the consumed slots of the component are debited (as described in method 1400) (step 1516). As described above, a consumed status indicates that the sequestered slots have been consumed by a consumer and that the producer has been debited at most the value of the ranking bid for the slot consumed. Conversely, if the computerized auction system 100 receives an indication that the sequestered slots are not going to be consumed, the sequestered slots are returned to an available status (step 1504).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A method for providing recipe recommendations to consumers based on a current ingredient inventory, the method comprising:

storing, by a server, a plurality of recipes in a first database, each of the plurality of recipes including a plurality of ingredients;

receiving, by a consumer device, a consumer ingredient inventory regarding ingredients in possession of a respective consumer in response to the respective consumer entering the consumer ingredient inventory into a consumer interface displayed to the respective consumer on the consumer device;

transmitting, by the consumer device, the consumer ingredient inventory to the server over a network;

storing, by the server, the consumer ingredient inventory of the respective consumer received from the consumer device in a second database;

comparing, by a processing circuit of the server, the consumer ingredient inventory of the respective consumer stored in the second database to the plurality of recipes stored in the first database to determine a relevance percentage indicative of an amount of each recipe held in the consumer ingredient inventory of the respective consumer;

separating, by the processing circuit, the plurality of recipes into sets based on the relevance percentage of each recipe;

providing, by the server, a first producer interface to a respective producer on a producer device of the respective producer for entering campaign parameters for a respective campaign, wherein the first producer interface provides (i) a product field facilitating selection of a respective ingredient for the respective campaign, (ii) a target bid field facilitating entry of a target bid for each unit of the respective ingredient for the respective campaign, (iii) a unit of measure field facilitating selection of a type of unit of measure that is used to measure a quantity of the respective ingredient, (iv) a quantity field facilitating entry of a campaign quantity of the respective ingredient for the respective campaign, and (v) an end bid field facilitating entry of a final bid for the respective campaign, wherein the target bid and the campaign quantity define a campaign budget, wherein the first producer interface facilitates the respective producer with selectively defining the campaign parameters, wherein the campaign parameters define an allocation line with a dynamically selectable slope, wherein a negative slope allocates a greater amount of the campaign budget to a slot at a beginning of the respective campaign than at an end of the respective campaign, a positive slope allocates a greater amount of the campaign budget to a slot at the end of the respective campaign than at the beginning of the respective campaign, and a zero slope allocates a consistent amount of the campaign budget to each of a plurality of slots;

receiving, by the producer device, the campaign parameters for the respective campaign of the respective producer for the respective ingredient in response to the respective producer entering the campaign parameters into the first producer interface displayed to the respective producer on the producer device;

transmitting, by the producer device, the campaign parameters for the respective campaign to the server over the network;

generating, by the processing circuit, the respective campaign of the respective producer based on the campaign parameters received by the producer device for the respective campaign, wherein generating the respective campaign includes:
- creating, by the processing circuit, the plurality of slots based on the campaign quantity of the respective ingredient, each of the plurality of slots including a portion of the respective ingredient; and
- determining, by the processing circuit, a ranking bid for each of the plurality of slots based on the campaign parameters, each ranking bid defining an amount of the campaign budget allocated for each of the plurality of slots, wherein the ranking bid for each of the plurality of slots is based on the slope of the allocation line;

storing, by the server, a plurality of campaigns for a plurality of producers in a third database, the plurality of campaigns including the respective campaign of the respective producer;

ranking, by the processing circuit, each recipe within each of the sets based on the plurality of campaigns regarding each of the plurality of ingredients in each recipe, wherein ranking each recipe within each of the sets includes:
- determining, by the processing circuit, a highest ranking bid from the plurality of campaigns stored in the third database for each ingredient in each recipe within each of the sets; and
- aggregating, by the processing circuit, the highest ranking bid for each ingredient in each recipe to determine a score for each recipe within each of the sets, the score for each recipe associated with a cumulative bid total for the plurality of ingredients of each recipe;

transmitting, by the server, the sets and the ranking of each recipe within each of the sets to the consumer device of the respective consumer over the network;

providing, by the consumer device, each of the sets sorted by the relevance percentage and each recipe within each of the sets sorted by the score associated therewith on the consumer interface; and selectively receiving, by the consumer device, a selection of one of the plurality of recipes for consumption through the consumer interface, wherein the ranked recipes within each of the sets are selectively accessible by the respective consumer through selecting one of the sets displayed on the consumer interface.

2. The method of claim 1, further comprising receiving, by the consumer device, a unit of measure in response to the respective consumer entering the unit of measure into the consumer interface displayed to the respective consumer on the consumer device, wherein the creation of the plurality of slots and the portion of the respective ingredient included in each of the plurality of slots is based on at least one of the unit of measure or the campaign quantity.

3. The method of claim 1, wherein the cumulative bid total for a first ranked recipe in a first set can be less than the cumulative bid total for a first ranked recipe in a second set with a lower relevancy percentage than the first ranked recipe in the first set.

4. The method of claim 1, wherein the campaign parameters include at least two of the campaign quantity, the campaign budget, or the target bid, and wherein the processing circuit is configured to determine a missing one of the campaign quantity, the campaign budget, and the target bid based on the other two of the campaign quantity, the campaign budget, and the target bid.

5. The method of claim 1, further comprising debiting, by the processing circuit, the campaign budget of the respective campaign of the respective producer in response to the respective consumer selecting the one of the plurality of recipes for consumption that includes the respective ingredient of the respective producer.

6. The method of claim 5, wherein the consumed recipe includes a recipe quantity of the respective ingredient, and wherein a portion of the plurality of slots of the respective campaign of the respective producer are consumed based on the recipe quantity of the respective ingredient in the consumed recipe.

7. The method of claim 1, further comprising:
- determining, by the processing circuit, a residual for a consumed slot of the plurality of slots based on a proportional difference between a first cumulative bid total for the consumed recipe and a second cumulative bid total for a reference recipe, wherein the reference recipe is a next ranked recipe in a set of recipes that includes the consumed recipe;
- debiting, by the processing circuit, the respective campaign of the respective producer a difference between the ranking bid for the consumed slot and the residual; and
- adding, by the processing circuit, the residual to the ranking bid of a next one of the plurality of slots of the campaign of the respective producer that is available.

8. The method of claim 1, further comprising providing, by the server, a second producer interface on the producer device of the respective producer, wherein the second producer interface provides at least one of a graph or a table visually presenting a progress of the respective campaign of the respective producer including an amount of the campaign budget consumed.

9. A system for providing recipe recommendations to consumers based on a current ingredient inventory, the system comprising:
- a server;
- a consumer device; and
- a producer device;

wherein:
- the server is configured to store a plurality of recipes in a first database, each of the plurality of recipes including a plurality of ingredients;
- the consumer device is configured to receive a consumer ingredient inventory regarding ingredients in possession of a respective consumer in response to the respective consumer entering the consumer ingredient inventory into a consumer interface displayed to the respective consumer on the consumer device;

the consumer device is configured to transmit the consumer ingredient inventory to the server over a network;

the server is configured to store the consumer ingredient inventory of the respective consumer received from the consumer device in a second database;

the server is configured to compare the consumer ingredient inventory of the respective consumer stored in the second database to the plurality of recipes stored in the first database to determine a relevance percentage indicative of an amount of each recipe held in the consumer ingredient inventory of the respective consumer;

the server is configured to separate the plurality of recipes into sets based on the relevance percentage of each recipe;

the server is configured to provide a first producer interface to a respective producer on the producer device of the respective producer for entering campaign parameters for a respective campaign, wherein the first producer interface provides (i) a product field facilitating selection of a respective ingredient for the respective campaign, (ii) a target bid field facilitating entry of a target bid for each unit of the respective ingredient for the respective campaign, (iii) a unit of measure field facilitating selection of a type of unit of measure that is used to measure a quantity of the respective ingredient, (iv) a quantity field facilitating entry of a campaign quantity of the respective ingredient for the respective campaign, and (v) an end bid field facilitating entry of a final bid for the respective campaign, wherein the target bid and the campaign quantity define a campaign budget, wherein the first producer interface facilitates the respective producer with selectively defining the campaign parameters, wherein the campaign parameters define an allocation line with a dynamically selectable slope, wherein a negative slope allocates a greater amount of the campaign budget to a slot at a beginning of the respective campaign than at an end of the respective campaign, a positive slope allocates a greater amount of the campaign budget to a slot at the end of the respective campaign than at the beginning of the respective campaign, and a zero slope allocates a consistent amount of the campaign budget to each of a plurality of slots;

the producer device is configured to receive the campaign parameters for the respective campaign of the respective producer for the respective ingredient in response to the respective producer entering the campaign parameters into the first producer interface displayed to the respective producer on the producer device;

the producer device is configured to transmit the campaign parameters for the respective campaign to the server over the network;

the server is configured to generate the respective campaign of the respective producer based on the campaign parameters received by the producer device for the respective campaign, wherein, to generate the respective campaign, the server is configured to:

create the plurality of slots based on the campaign quantity of the respective ingredient, each of the plurality of slots including a portion of the respective ingredient; and determine a ranking bid for each of the plurality of slots based on the campaign parameters, each ranking bid defining an amount of the campaign budget allocated for each of the plurality of slots, wherein the ranking bid for each of the plurality of slots is based on the slope of the allocation line;

the server is configured to store a plurality of campaigns for a plurality of producers in a third database, the plurality of campaigns including the respective campaign of the respective producer;

the server is configured to rank each recipe within each of the sets based on the plurality of campaigns regarding each of the plurality of ingredients in each recipe, wherein, to rank each recipe within each of the sets, the server is configured to:

determine a highest ranking bid from the plurality of campaigns stored in the third database for each ingredient in each recipe within each of the sets; and aggregate the highest ranking bid for each ingredient in each recipe to determine a score for each recipe within each of the sets, the score for each recipe associated with a cumulative bid total for the plurality of ingredients of each recipe;

the server is configured to transmit the sets and the ranking of each recipe within each of the sets to the consumer device of the respective consumer over the network;

the consumer device is configured to provide each of the sets sorted by the relevance percentage and each recipe within each of the sets sorted by the score associated therewith on the consumer interface; and the consumer device is configured to selectively receive a selection of one of the plurality of recipes for consumption through the consumer interface, wherein the ranked recipes within each of the sets are selectively accessible by the respective consumer through selecting one of the sets displayed on the consumer interface.

10. The system of claim 9, wherein the consumer device is configured to receive a unit of measure in response to the respective consumer entering the unit of measure into the consumer interface displayed to the respective consumer on the consumer device, wherein the creation of the plurality of slots and the portion of the respective ingredient included in each of the plurality of slots is based on at least one of the unit of measure or the campaign quantity.

11. The system of claim 9, wherein the cumulative bid total for a first ranked recipe in a first set can be less than the cumulative bid total for a first ranked recipe in a second set with a lower relevancy percentage than the first ranked recipe in the first set.

12. The system of claim 9, wherein the campaign parameters include at least two of the campaign quantity, the campaign budget, or a target bid, and wherein the server is configured to determine a missing one of the campaign quantity, the campaign budget, and the target bid based on the other two of the campaign quantity, the campaign budget, and the target bid.

13. The system of claim 9, wherein the server is configured to debit the campaign budget of the respective campaign of the respective producer in response to the respective consumer selecting the one of the plurality of recipes for consumption that includes the respective ingredient of the respective producer.

14. The system of claim 13, wherein the consumed recipe includes a recipe quantity of the respective ingredient, and wherein a portion of the plurality of slots of the respective campaign of the respective producer are consumed based on the recipe quantity of the respective ingredient in the consumed recipe.

\* \* \* \* \*